United States Patent [19]
Link

[11] Patent Number: 6,129,193
[45] Date of Patent: Oct. 10, 2000

[54] ELECTRIC FAN CLUTCH

[75] Inventor: Larry Ray Link, Frankfort, Ill.

[73] Assignee: American Cooling Systems, L.L.C., Grand Rapids, Mich.

[21] Appl. No.: 09/140,511

[22] Filed: Aug. 26, 1998

Related U.S. Application Data

[63] Continuation-in-part of application No. 08/920,569, Aug. 29, 1997.
[60] Provisional application No. 60/095,498, Aug. 6, 1998.

[51] Int. Cl.[7] .............................. F16D 19/00; H02K 49/00
[52] U.S. Cl. ............................ 192/84.1; 310/92; 310/103
[58] Field of Search .................................. 192/84.1, 84.2, 192/84.31; 310/92, 62, 63, 103, 156, 187

[56] References Cited

U.S. PATENT DOCUMENTS

| | | | |
|---|---|---|---|
| 3,552,351 | 1/1971 | Willem | 118/6 |
| 3,924,585 | 12/1975 | Woods | 192/84.961 |
| 4,095,922 | 6/1978 | Farr | 310/153 X |
| 4,189,654 | 2/1980 | Mourier | 310/103 X |
| 4,554,491 | 11/1985 | Plunkett | 310/62 X |
| 4,671,739 | 6/1987 | Read et al. | 416/230 |
| 5,053,666 | 10/1991 | Kliman et al. | 310/62 X |
| 5,565,723 | 10/1996 | Dastidar | 310/103 |
| 5,669,336 | 9/1997 | Williams | 123/41.12 |
| 5,687,823 | 11/1997 | Nakagawa et al. | 192/84.961 |
| 5,763,969 | 6/1998 | Metheny et al. | 310/62 |
| 5,900,203 | 5/1999 | Needham et al. | 264/248 |
| 5,982,064 | 11/1999 | Umeda et al. | 310/62 X |

*Primary Examiner*—Charles A. Marmor
*Assistant Examiner*—Roger Pang
*Attorney, Agent, or Firm*—Fitch, Even, Tabin & Flannery

[57] ABSTRACT

A magnetic slip clutch system that can be used tin a number of different applications where a slip clutch is desired to be used; and particularly, to applications where the clutch is desired to be fully disengaged, i.e., free-wheeling, fully engaged to transmit 100% of the power, or coupled in a modulated or slip manner for transmission of a variable amount of power. The torque transfer is modulated by controlling the electric power to the clutch.

22 Claims, 19 Drawing Sheets

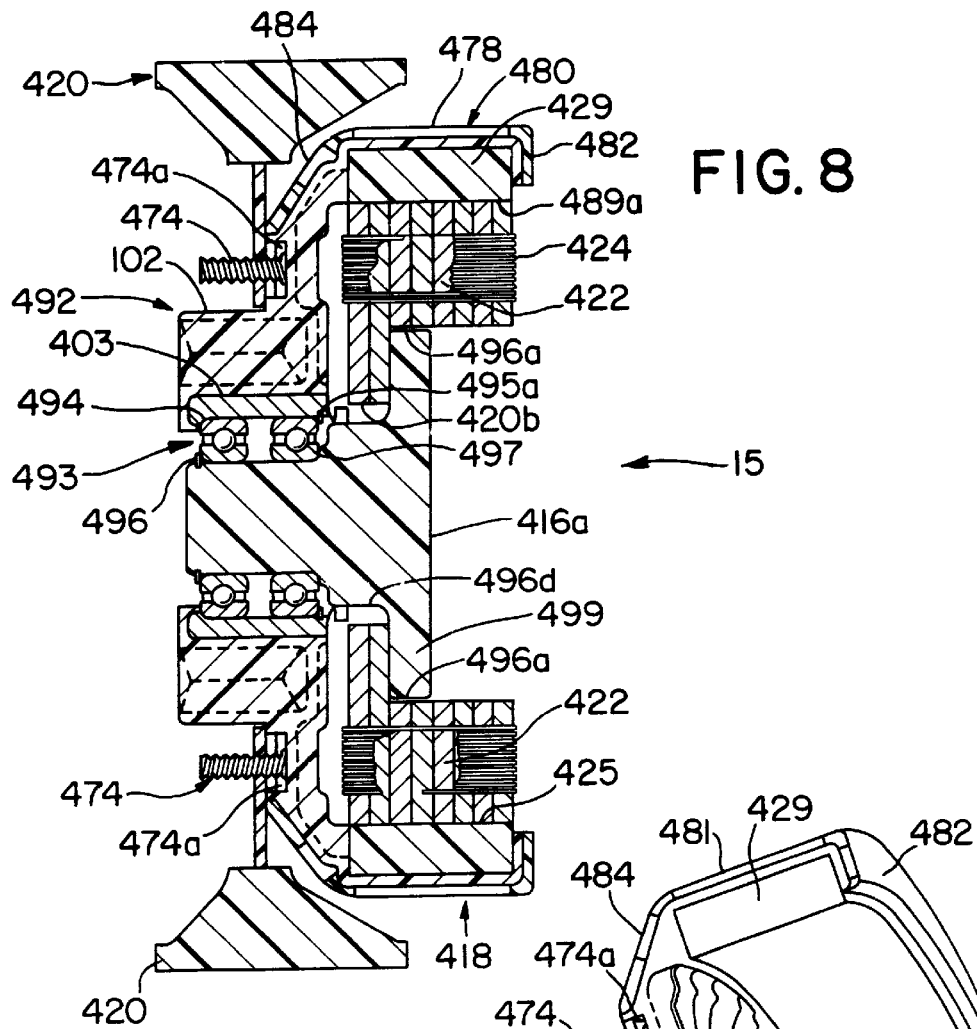
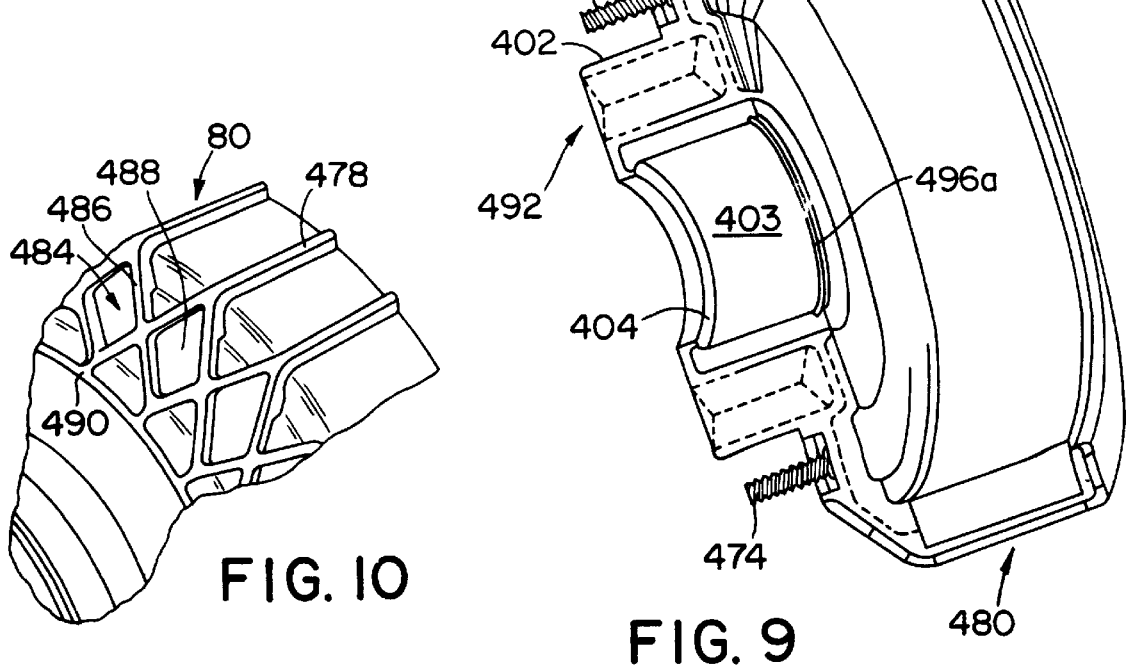
FIG. 8
FIG. 9
FIG. 10

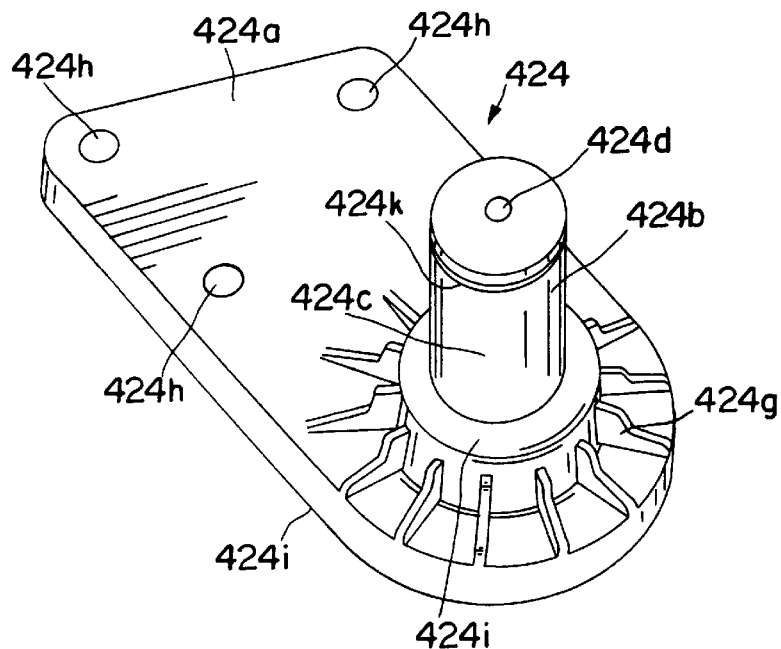
FIG. 14
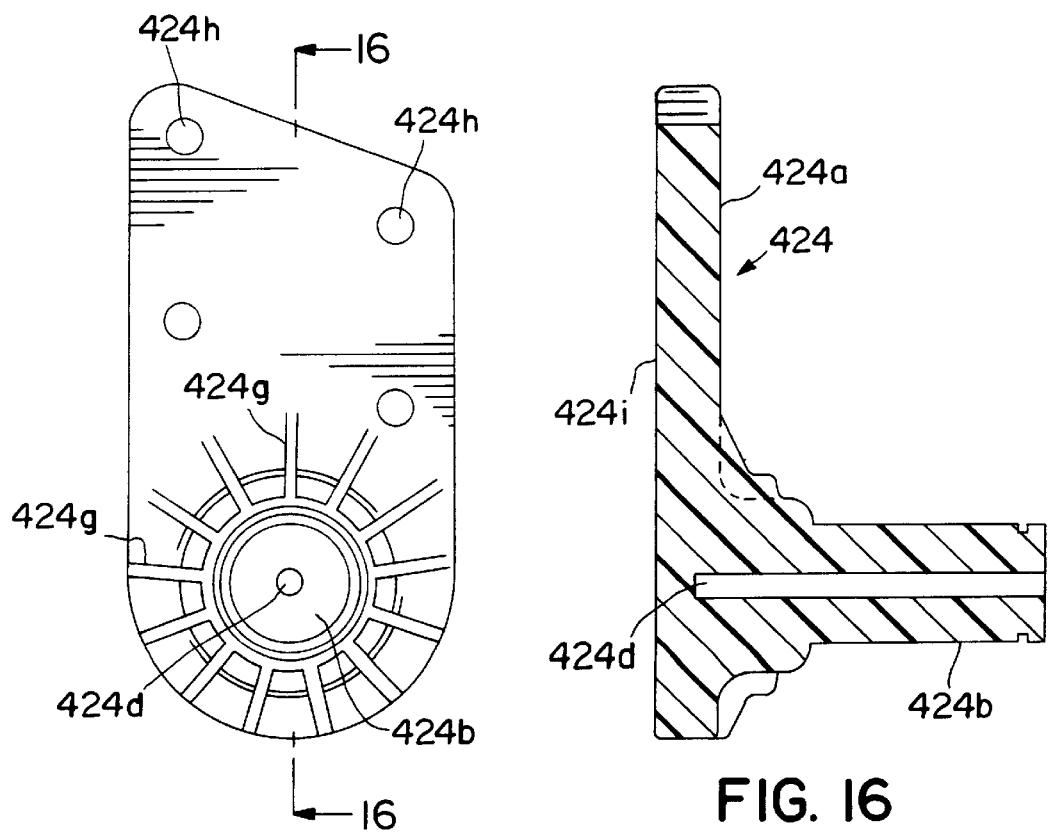
FIG. 15
FIG. 16

ELECTRIC FAN CLUTCH

CROSS-REFERENCE TO RELATED APPLICATIONS

This is a continuation-in-part of copending, application Ser. No. 08/920,569, filed Aug. 29, 1997, entitled "Electric Fan Clutch", and claims priority from U.S. provisional application No. 60/095,498, filed Aug. 6, 1998, now abandoned, entitled "Magnetic Fan Clutch".

FIELD OF THE INVENTION

This invention relates to a magnetic slip clutch system, and to its use in a temperature control system for internal combustion engines having a fan and a magnetic slip, fan clutch to drive the fan.

BACKGROUND OF THE INVENTION

The present invention is directed to a magnetic slip clutch system that can be used in a number of different applications where a slip clutch is desired to be used; and particularly, to applications where the clutch is desired to be fully disengaged, i.e., free-wheeling, fully engaged to transmit 100% of the power, or coupled in a modulated or slip mariner for transmission of a variable amount of power. The torque transfer is modulated by controlling the electric power to the clutch. One use of such a clutch is disclosed in copending, Provisional patent application Serial No. 60/095,750, filed Aug. 7, 1998, entitled "Magnetic Clutch Method and Apparatus for Driving a Vehicle Air Conditioner". The present invention will be described in connection with another application of the magnetic slip clutch as a fan clutch, which could be used with fans used to cool electric motors as well as internal combustion engines.

In a typical large truck in the United States, having a liquid cooled internal combustion engine, the fan clutch is either disengaged completely with two clutch faces separated or fully engaged with the two clutch faces transmitting power across the clutch face interface without any slippage between the faces. Usually, the clutch faces are engaged or disengaged pneumatic or electromagnet actuators. When the clutch is engaged in the large truck, considerable power is used to drive the fan. Where the fan is a 32" diameter fan, the power used to drive the fan can be as much as 40–80 horsepower for large trucks which have engines in the range of 200–600 horsepower. On the other hand, when the fan is fully off, the fan is disconnected from the power drive from the engine's crankshaft. The fan is free-wheels and does not contribute to cooling of the engine. In these particular type of on/off electromagnetic and air-actuated fan clutches, the fan is disconnected when the engine is cold or is being adequately cooled, for instance when air is forced rapidly through the radiator by high speed travel of the vehicle.

The control system for the fan clutch includes a thermostat, which monitors the engine or the cooling fluid temperature and tries to maintain the temperature within a predetermined range— for example, 181°–190° F.); and the control system includes a speed measuring sensor which disengages the clutch when the vehicle speed reaches a set speed—for example, 30 mph. At 30 mph, it is assumed that there is sufficient ram air flow across the radiator to cool the engine without operation of the fan.

With large trucks which are running at 2,100 rpm and which use 40–80 horsepower to drive a large fan having a large movement of inertia, e.g., a 32-inch diameter fan, it is necessary to build a fairly substantial fan clutch to withstand the shock of suddenly engaging and rotating the inertia of a stationary, driven clutch face and its attached fan quickly to its full rotational speed. Consequently, current fan clutches are quite large and substantially made to withstand such shock loads.

The typical ON/OFF conventional fan clutch used or large trucks or the like employs metal machine parts which are relatively heavy and take considerable horsepower to accelerate and to overcome the inertia thereof. For example, when the fan is of a 32" diameter, the horsepower used to drive the fan can be as much as 40 to 80 hp for large trucks which have engines in the range of 200 to 600 hp. The machining of the fan clutch metal pieces also adds considerably to the cost of this fan clutch. The ON/OFF fan clutches also must be relatively strong and made of metal to withstand the torque impulse forces which are applied relatively quickly, e.g., in about 1.2 seconds, when the fan clutch goes from fully off, light torque load to a very high, full torque load to accelerate the fan-carrying part to its maximum speed, which is generally about the engine speed which can be 2,400 rpm. Thus, it is necessary to build a fairly substantial metal fan clutch to withstand the shock of the sudden inertia load of the stationary driven clutch base and its attached fan. Consequently, current ON/OFF fan clutches are quite large and are substantially made to withstand such shock loads and high forces when the fan blades are being accelerated to rotate at high speeds and subjected to large centrifugal force loads at high rotational speeds. The metal pulley and fan carrying pieces require considerable machining to provide the desired surfaces, reference locations, and bearing seats. Such machining adds considerably to the cost of this clutch.

The ON/OFF fan clutches use frictional faces which wear and generally need to be replaced after 150,000 miles or so in order to meet the warranty requirements, which warrant the fan clutch for about 250,000 miles. Of course, the replacement of the friction faces results in a substantial amount of down time during their removal and their replacement. In contrast thereto, the electromagnetic fan clutch uses only rotational parts rather than frictional parts and uses only a magnetic field to transfer the torque of the rotating input pulley part to the driven rotational part carrying the fan blades. With current ON/OFF fan clutches, the sixty or so horsepower used by the onset of the fan load and the considerable horsepower used to accelerate the fan under an impulse load, for example, of 60 hp to turn a large 32" fan, is noticeable for large trucks climbing a grade. When the fan clutch comes on and takes 60 hp, the engine must slow down and often the driver must shift down two gears to keep the vehicle going. There is a need for a relatively soft engagement which can be controlled so as to avoid the full application of 60 hp over the short impulse time of 1.2 seconds or the like, thereby eliminating the need to downshift.

It appears that these current ON/OFF fan clutches may be engaged at least 12% of the time for large trucks or the like. Since the large truck is using the full extent of the fan horsepower with the ON/OFF clutch, there may be as many as 40 to 80 hp being used to drive the fan when there is relatively small need for full engagement, because a partial engagement would satisfy the cooling needs. There is a need for an electromagnetic fan clutch that can supply a modulated torque of less than full torque and more than a minimal torque and would be engaged for a lesser time period, e.g., only about 1% of the time. Further, the magnetic clutch should be able to be modulated to increase the torque transfer gradually to eliminate the large shock loads of the ON/OFF fan clutch.

An additional consideration with the ON/OFF fan clutch is that of the large amount of noise generated by the fan which is rotating at high speeds for 12% of the time. It is estimated that as much as 50% of the noise from a large truck emanates from the fan which is beating or slapping the air as it rotates at about engine speed to cool the engine. A reduction in noise level using a modulated fan clutch could open new markets for equipment using fans and fan clutches where the equipment cannot be used in the evenings or at night if it exceeds regulated noise levels.

In addition to such load problems from the large movement of inertia, another problem with current fan clutch systems is that of chattering, i.e., an abrupt, recurring, on/off engagement of the clutch fan faces due to a rapid opening and closing of a thermostat switch trying to maintain the cooling temperature between 181° F. and 190° F. Typically, the on/off thermostat has a variation of seven degrees (7° F.) with a tolerance of plus or minus two (2° F.) degrees between turning on or shutting off. In some adverse, ambient conditions of operation, this cycling goes back and forth as many as 50 times per hour, thereby causing wear and tear on clutch faces, when they are being repeatedly mechanically engaged and disengaged.

When the clutch is operated by an air pressure system from the truck's compressed air system, other problems arise. That type of clutch uses compressed air to operate the clutch actuator system. It is difficult to keep the compressed air clean. The truck compressor air is usually too dirty to be used directly to operate the fan clutch actuator system. The air must first be cleaned by bubbling it through oil in an oil filter which traps dirt from the air. If the oil in the filter becomes dirty, it will pass contaminants. The still-contaminated air may compromise a downstream pressure regulator resulting in an insufficient air pressure for operating the clutch actuator, e.g., the air pressure may drop below 70 pounds and not provide sufficient force to operate the clutch. If the fan is not operated, the temperature can reach 450° F. at the fan blades. The plastic fan may ignite setting the entire truck afire. pneumatic fan clutch systems are bulky and expensive.

With the current fan clutch systems in large trucks in the United States, the driver turns on the air conditioning system for the truck and the fan clutch is automatically engaged to turn the fan at full speed even though full fan speed may not be needed for adequate cooling of the engine. For example, the ram air flowing through the radiator at high vehicle speeds could be sufficient to keep the air conditioner and the truck engine temperature low enough without the fan. While engaging the fan clutch when the air conditioner switches on ensures that the air conditioning system and the engine are kept cool at all times, it wastes energy.

Current fan clutch systems in trucks have the fan mounted fairly high which keeps the nose or the front end of the vehicle high. Truck manufacturers and truck drivers want to lower the truck nose for streamlining the aerodynamics of the truck and to provide a better view of the road. In some trucks, the radiator has been turned on its side so that it is a side-flow radiator in order to lower the tractor nose profile. In some tractors, there is insufficient space to position a large fan on its side and place it between the frame rails for the vehicle. Hence, the fan cannot be side-mounted to drop it lower.

These electromagnetic and pneumatically-clutched fans are not directly connected to the engine crankshaft because the crankshaft vibrates at a natural frequency that causes the engaged faces of the clutch plates to vibrate against one another and to wear quickly. Thus, most trucks in the United States have a fan belt drive from the crankshaft to the fan clutch which is located above the crankshaft. A fan belt drive, however, takes space, and the belt is subject to failure. The fan belt system also adds cost to the engine cooling system. Although many truck manufacturers would prefer to lower the radiator and fan to the location of the crankshaft, they are unable to do so because of the crankshaft vibrations and the space needed for the fan belt drive of the fan clutch and fan.

In Europe and in other places such as South America there is often used a viscous fluid fan clutch which is always rotating at speeds of 400 to 600 RPM, even when the fan is turned off. That is, the viscous fluid rotates the fan because of the friction and shears. When the viscous fan clutch is turned on, it never is able to produce or transfer 100% of the input power or torque because 7–10% of the power is lost with viscous fluid shearing. Because of the fluid viscosity and friction, this fan clutch is never totally disengaged to be free-wheeling as it is constantly engaged so that it is always using a considerable amount of the power. This power, of course, is wasted fuel consumption, which makes it a relatively inefficient fan clutch from a fuel economy standpoint. This particular fan clutch also uses a bi-metallic thermostat on the front of the fan assembly to measure temperature and a plunger is operated by the thermostatic switch, which requires ram air to operate. On slow moving construction vehicles or the like where there is relatively little ram air, such a thermostatically controlled fan clutch is not readily usable. Likewise, for an ON/OFF fan clutch used on trucks there is a requirement for the use of compressed air which is often not available for construction or farm equipment and therefore makes the clutch less saleable to makers of such equipment.

Currently, it is desired to eliminate the 7–10% viscous shear inefficiency without an increase size of the radiators and to provide this increased efficiency to power the fan in order to run-the engines hotter using the same cooling equipment. The magnetic fan disclosed in the aforesaid patent application can be used with these hotter engines because it transfers 100% of the power using a magnetic field and does not have the 7–10% inefficiencies due to the viscosity of the viscous fluid.

In all of these fans and fan clutch systems, removal of heat is a significant problem for the bearings and for the fan belts. The failure of bearings or the breaking of fan belts are a considerable cause of maintenance or down time. By keeping the bearings and fan belt temperature lower, the life of the belts and bearings can be improved considerably. These are important considerations with respect to the maintenance and the overall down time with respect thereto caused by bearing or belt failures. The replacement of a bearing on a fan clutch is a significant maintenance problem for a truck or a piece of equipment. Thus, there is a need for a new and improved magnetic clutch that overcomes the deficiencies of existing ON/OFF frictional face clutches and existing viscous fluid clutches.

Some vehicles, principally in Europe, have a fan clutch which is mounted on the crankshaft and which is always partially engaged to transfer a certain amount of power to the fan. For example, at least 40% of the power to turn the fan to full speed needed and up to 90% of the power to turn the fan at full speed. This clutch never transfers 100% of the power, and this clutch is never totally disengaged such that the fan can be free-wheeling. This particular type of clutch also has a vibration isolator which to some extent serves to dampen or isolate vibrations at the fan clutch from the crankshaft vibrations. If the vibration isolator wears out allowing vibration to be transmitted, the clutch will wear out in only a few days.

Such a constantly engaged fan wastes fuel. If the fan consumes a maximum of 40–80 horsepower, and the fan never uses less than 40% of its input power, this means that at least 16 horsepower is being consumed that may not be needed. At the higher end, 40% of the 80 horsepower is 32 horsepower which may not be needed but it is always being expended. This unneeded expenditure of energy results in fuel inefficiencies for vehicles having such fan clutches.

Similarly, in most automobiles, the fan runs continually while the vehicle engine is running. Such continuous fan operation wastes fuel, particularly when the engine is moving at a sufficient speed to provide ram air which would cool the engine; or when the engine is cold and there is no need for any further cooling by a fan.

It will be appreciated that pneumatic or electromagnetic actuators for bringing the clutch faces into engagement are relatively complex, occupy considerable space, heavy and costly. The controls using the thermostat on and off switch as well as a speedometer sensor on/off switch provide the most rudimentary information because more information would not enable any more sophisticated thermal management due to the fact that the clutch cannot be modulated in its torque transfer and thereby achieve proportional control of engine temperature. Also, it will be appreciated that the amount of horsepower being used for a fan cooling system is very substantial in that great fuel economy savings could be accomplished by having an improved fan clutch and control system for the internal combustion engine cooling.

SUMMARY OF THE INVENTION

In accordance with the present invention, there is provided a new and improved, magnetic slip clutch system and also to such a magnetic slip clutch system, for use with an internal combustion engine. The invention will be described in connection with a slip clutch used to provide a variable speed drive of the fan by the engine with the coupling between the fan and the engine being solely by a magnetic field. The variable speed drive provides true proportional control of the convective heat transfer rate from the radiator.

In accordance with the preferred embodiment of the invention, the clutch may be fully uncoupled so as to not use any power when the engine is cold or adequately cooled by air flow, and may be coupled in a modulated manner for transmission of variable power depending upon the cooling needs up to and including a full coupling where the need is the greatest for cooling. The torque transfer between the driving element of the electromagnetic clutch and the driven element of the electromagnetic clutch is modulated by controlling the electric power to the clutch to provide a true, variable speed for the clutch-driven member, such as a fan.

In contrast to the electromagnetic or the pneumatically-powered clutches of the prior art used for driving fans, there are no face plates which are brought into engagement or disengagement; but there is a space or air gap between the driving electromagnetic portion and the driven electromagnetic portion of the clutch. There is the ability to have a smooth, torque transfer with the current being varied to the electromagnetic fan clutch with slippage between the driving and driven clutch elements in a predictable manner with changes in electric power. For example, the electric power may be varied from as low as one volt for low current with very high slippage up too much as to the full power with no slippage between the driving clutch and driven clutch elements. There is a smooth torque transfer which is modulated electrically.

The illustrated and preferred electromagnetic fan clutch is simple as compared to the existing fan clutches in that its rotating parts are lighter, have a smaller moment of inertia, and longer life, and there is no need for an pneumatic supply to engage or to disengage the clutch. Unlike some of the current crankshaft-mounted systems that have a 40% engagement at all times, the electromagnetic clutch of the present invention may be completely uncoupled so that the fan is free-wheeling when it is not needed and is not consuming energy. Likewise, the amount of clutch coupling may be smoothly varied to provide a variable speed with slippage occurring from the low power input to the clutch through the full power input. At full power, there is no slippage and the driving part and driven part are locked rotating at the same rotational speed.

In accordance with the present invention, there is provided a new and improved magnetic clutch which is formed with a magnetic field coupling between a driving or pulley element which is made of lightweight, strong plastic and a driven element or fan cover made of lightweight, strong plastic in contrast to the heavy steel or metal pieces used in the conventional ON/OFF clutches having engageable frictional faces. The use of plastic pieces is achieved in part because of a modulated, relatively slow torque transfer from zero torque to full transfer of torque over a controlled period such as 6 seconds versus the relatively sharp impact torque transfer pulse of about 1.2 seconds for the frictional ON/OFF clutch. The slow modulated acceleration and torque transfer allow the use of small, lightweight plastic components whereas the fast acceleration and high inertia and torque loads of conventional fan clutches require substantial and metal materials.

In accordance with an important aspect of the present invention, the driving pulley part and the driven fan part are preferably made lightweight by using a plastic ribbed or honeycombed construction, as contrasted to a solid piece construction. The honeycomb construction provides strength and large surface areas to transfer heat from the plastic to the ambient air.

Preferably, the molded plastic cover and/or pulley are also provided with ribs on their exterior surfaces to stir the air and assist in transferring heat from the part and from its associated bearings.

Preferably, the pulley cover, the clutch mounting bracket, and the driven, fan blade-cover are molded to size and dimensioned to reduce the amount of machining relative to the machined metal pieces of the ON/OFF fan clutches. This reduces the cost of the magnetic fan clutch components. Also, the preferred plastic materials have good strength and heat transfer characteristics. A nylon material filled with about 30–35% glass by weight provides the strength and heat transfer needed and is one of several engineered plastic materials that can be molded to dimension and withstand the high temperatures encountered on a truck or the like.

The magnetic clutch of this invention may be used to transfer torque in other applications instead of the fan to drive other components on a vehicle such as air conditioner compressor. Likewise, the fan clutch can be used on non-vehicles such as fan-cooled air conditioners or the like.

The present invention provides a new and improved fan clutch which is relatively lightweight and made of plastic parts and is constructed to provide good heat dissipating qualities. Unlike the conventional ON/OFF clutches having frictionally engageable faces which interengage with one another and which need to be replaced at about 150,000 miles in order to fill the requirements of a 250,000 mile warranty for a typical ON-OFF clutch, the present invention has no such frictional faces but only rotating surfaces such as the pole pieces and the permanent magnets which are spaced from each other by the air gap. The magnetic field across the air gap causes the driving of the outer driven element having the fan blades thereon without wearable friction surfaces. There is considerable increased reliability where there is no frictional material used. Further, as explained above, the relatively soft engagement where the load is modulated over six seconds from being off to the maximum torque load and a reduction in the percentage of time that the clutch is operating at full load from a 12% of the time for the ON/OFF clutch to an estimated 1% of the time for the magnetic fan clutch results in increased bearing and belt life, which are the two major failures in fan clutches today. The softer engagement is accomplished by having the clutch be initially engaged at relatively low torque and increasing the magnetic field gradually over six seconds to the maximum magnetic field.

Unlike the viscous fan clutches used in Europe where there is a viscous shearing loss of 7% to 10% at the upper rotational torque load of the fan, the present invention has no such viscous shearing loss. In Europe and other venues, there is an increasing desire to run the engines hotter without increasing radiator size to dispense the extra heat of the higher temperature engines. If the 7%–10% that is lost with the slippage in the viscous fluid clutches were eliminated, more cooling could be obtained with the same clutch. Also, it will be appreciated that the power lost with viscous shear wastes fuel. Further, the viscous fan drives always run the fan at least 400 RPM due to the friction and shearing action of the viscous fluid used. If an air conditioner is being used, the friction and shearing action of the viscous drive may rotate the fan as much as 600 RPM. This use of power to run the fan at 400 to 600 RPM is a waste of fuel. In contrast thereto, the fan of the present invention is basically off except for the slight frictional bearing and seal drag which may cause the ram air to turn the fan blade at up to 70 RPM.

The present invention allows the use of a signal from a controller 400 such as the ECM controller presently used with engines which provides a 50 Hertz signal to the control circuit for the electromagnetic clutch. The electromagnetic clutch does not require the compressed air as do the conventional ON/OFF clutches having the frictional faces and therefore is readily used on slow moving equipment which usually lacks any compressed air source. The viscous fan clutches are generally not used on slow moving construction equipment or farm tractors or the like, there is no high speed ram air flow which will successfully operate the bi-metallic strip plunger to open a valve.

The fan noises generated is very substantial. In fact, it is thought that as much as 50% of the overall truck noise comes from the fan being slapping the air as it is turned at high speed. Of course, the greater the speed at which the fan is turning, the more hp is being used which reduces the fuel efficiency and the higher speed of the fan the greater noise that is being generated. Rather than driving the fan continuously at high engine speeds as in the ON/OFF clutch arrangement using frictional surfaces, the engine can be operating at high speed and the electromagnet fan clutch can be rotating the fan blades at a relatively lower speed because of the magnetic field slip drive. That is, the amount of magnetic force controls the amount of actual hp being used to drive the fan and the fan speed is not tied directly to the engine speed, unless so desired. In some countries, such as in Europe, significant noise specifications restrict the use of motorized equipment that can be operated after 6:00 PM in metropolitan areas. This applies to construction equipment as well as possibly to trucks. The lower fan noise from a magnetic fan clutch will help meet these noise specifications.

The present invention would also be of considerable importance to reducing the noise being generated by fans and air-conditioning systems in large buildings which have extremely noisy compressor rooms where the compressors are running for long periods of time generating great noise.

Because the belt life of the present invention may be doubled as the may be the bearing life, the present invention is also extremely useful for remote operations, such as oil pumping rigs, where a belt break can result in a high maintenance cost, including significant downtime. Failure of bearings is also another important breakdown failure in such remote areas.

Also, the present invention is of particular use in diesel engines where there is a waste gate which returns exhaust gas back into the engine such that the engine temperature comes up fast. With the present invention, this can be sensed and the fan clutch can be modulated to keep the engine temperature more even and to anticipate the heat increase with opening of the waste gate.

In accordance with important aspects of the invention, there is an overall temperature management system and a computer-managed cooling system, which allow better and tighter modulation control of the engine cooling. More specifically, there is now provided a computer-managed cooling system for a vehicle which has increased number of input sensing elements which sense the state or condition of a number of pieces of equipment and temperatures and which provide inputs to a computer which provides fan output signals and current flow to the fan clutch. The voltage may quickly and incrementally modulated to thereby modulate the amount of torque transfer to the fan to provide a true, variable speed for the fan depending upon the environmental conditions. This computer-managed cooling system, unlike the on/off, direct systems of conventional trucks, can provide power transmission to the fan that is responsive to the overall thermal conditions, and not just water temperature and speed conditions, as in the usual and conventional cooling systems having an on/off fan clutch.

In accordance with the preferred embodiment of the invention, the overall temperature management controller system includes sensors connected to the air conditioner and supplying input signals to the controller, which operates according to an algorithm that does not require the fan clutch to be engaged (or requires it to be only partially engaged) if the other parameters being measured indicate that the engine and air conditioner are being adequately cooled. Additionally, the present invention provides a much tighter or closer temperature modulation control by monitoring a number of conditions beyond the usual cooling temperature thermal sensor and the speed sensor by having, e.g., an air conditioner sensor, a waste gate sensor which senses when a turbocharger's waste gate is in operation. The waste gate is connected to return from the turbocharger the exhaust gases which are to be reburned, as during a truck start-up when heavy, white smoke exhaust would otherwise be discharging from the truck's engine.

The temperature modulation may be tuned or measured very precisely using a temperature resistance varying sensor to measure the cooling temperature, rather than a thermostatic on/off switch. Slight changes in resistance send electrical signals to the controller to allow a finer temperature cooling range for the present invention relative to the usual 7.5° F. plus or minus a tolerance of 2° F. in temperature for the prior art electromagnetic and pneumatic fan clutches. Other environmental sensing conditions may be sensed and signals therefrom fed to the computer to cause a variation in the current or power to the fan clutch so that only the horsepower needed to keep the fan operating at the desired speed is used for the cooling. Because the microprocessor can rapidly calculate the amount of fan cooling needed on an almost instantaneous basis, the electrical modulation and torque transfer through the magnetic field modulated clutch may be done quickly and continually.

In accordance with another aspect of the invention, the preferred magnetic slip clutch comprises a radially disposed set of electromagnets and a surrounding set of ferro-magnetic pole pieces separated by an air gap without any direct engaging mechanical clutch faces. The magnetic field between the electromagnets and the pole pieces is increased as the current through the electromagnets is increased. At low current, such as provided by a one volt potential, there is substantial slippage with the driving element rotating much slower than the driven element. At half current, such as provided by about 6 volts, the driven element will be rotating at about one-half the speed of the driving element with substantial slippage occurring between the clutch driving element and the clutch driven element. At about eleven or twelve volts potential of current through the electromagnets causes them to provide a magnetic flux density sufficient to provide full magnetic coupling. With full magnetic coupling, the pole pieces and the driving magnets rotate at the same speed and without slippage therebetween. Thus, it may be seen that the torque transfer may be modulated between zero percent, when the clutch is de-clutched, to 100 percent torque transfer when the clutch is fully engaged.

Preferably, slots are formed in the ferro-magnetic material of the electromagnets to reduce any eddy currents being induced therein. Likewise, it is preferred to have slots in the pole pieces to reduce any eddy currents resulting from slippage when driving at less than fully engaged, 100% torque transfer.

It will be appreciated that the present invention allows a direct crankshaft mounting of the fan clutch to the crankshaft because the driving portion or element of the electromagnetic clutch is spaced by an air gap from the driven element so that there is no rubbing or mechanical vibration of the driving portion against the driven portion, as in the engaged clutch faces of the prior art, fan face clutches. Unlike the other electromagnetic clutches currently being mounted directly on engine crankshafts, which are always providing at least 40% power to the fan, the present invention may have its fan fully decoupled so that there is no horsepower being used when there is no need for the same under control of the on-board controller.

BRIEF DESCRIPTION OF THE DRAWINGS

As shown in the drawings for purposes of illustration:

FIG. 8 is a cross-sectional view taken through the electromagnetic fan clutch which is constructed in accordance with the first embodiment of the invention;

FIG. 9 is a perspective view of a plastic cover for use in the electromagnetic fan clutch of FIG. 8;

FIG. 10 is a fragmentary, enlarged view of a rim portion of the plastic fan cover shown in FIG. 9;

FIG. 14 is a perspective view of the mounting plate for mounting the fan clutch to an engine;

FIG. 15 is a plan view of the mounting plate of FIG. 14;

FIG. 16 is a cross-sectional view taken through the mounting plate of FIG. 14;

DESCRIPTION OF THE PREFERRED EMBODIMENTS

Figure 1:
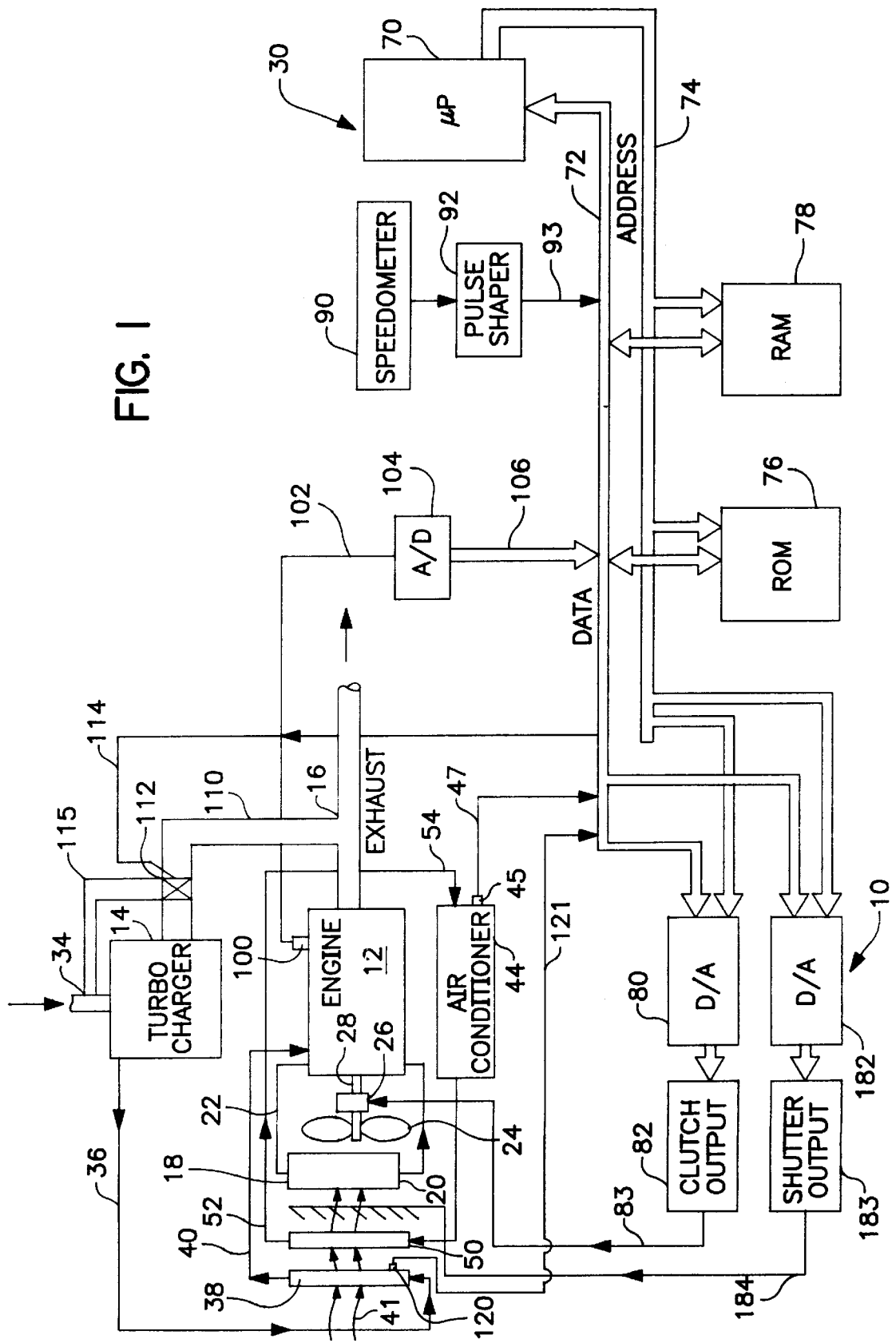
FIG. 1 is a block diagram of an electromagnetic clutch system embodying the novel features of the preferred embodiment of the invention.
Figure 5:
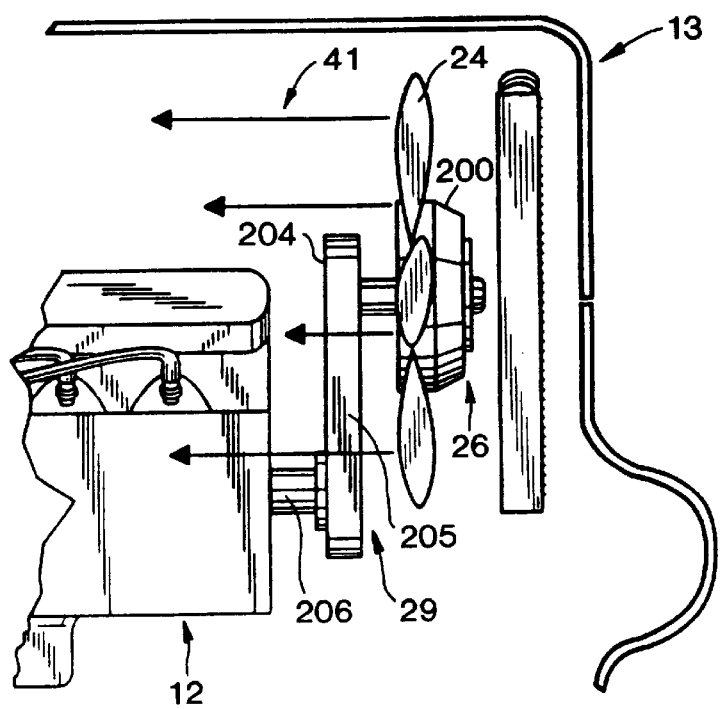
FIG. 5 is an illustration of a fan belt drive for the fan using the electromagnet clutch.

Referring now to the drawings, and especially to FIG. 1, a vehicle 10 is generally shown therein in block format and includes an engine 12 mounted within a vehicle 13 (FIG. 5). When the vehicle 13 is a truck or a turbocharged automobile, the engine 12 has connected thereto a turbocharger 14 for receiving air from an outside inlet 34 and an exhaust 16 for delivering exhaust gases either to the turbocharger or to the environment. The engine includes a cooling system 18 including a radiator 20 for a liquid coolant connected in a cooling loop 22 to the engine. Associated with the radiator 20 is a fan 24 coupled by a magnetic clutch 26 to an output shaft 28 of the engine 12. The output shaft may, for instance, be a crankshaft or some other device, such as a drive belt system 29, as shown in FIG. 5. A controller or controller circuit 30 is coupled to the electromagnetic clutch 26 to control actuation or deactuation of the fan as well as the relative fan speed and the amount of fan load presented to the engine 12 under varying conditions.

During normal operation, intake air flows into an intake 34 and is delivered to the turbocharger 14 where it is compressed and sent out on a compressed air line 36 to an intercooler 38. The intercooler 38 is positioned front-most in the tractor or cab portion of the truck, and receives cooling air from an outside source as shown by an air stream or air flow path 41. That cooling air then reduces the temperature of the compressed air at the intercooler 38, allowing higher, effective head pressures to be supplied at a compressed line 40 which is coupled to a manifold of the engine 12. Heat from the compressed air from the turbocharger 14 is transferred to the air stream 41 flowing about the intercooler. The engine also has a power take-off to drive an air conditioning compressor included in an air conditioning unit 44 and the air conditioning unit 44 supplies liquid phase refrigerant on a liquid phase line 46 to a condenser 50 positioned immediately behind the intercooler 38. A sensor 45 at the air conditioning unit or at its condenser may supply air conditioning signals over line 47 to a data bus 72 extending to the controller 30 to indicate the condition of the air conditioner. Heat is transferred from the gas in the condenser 50 causing the gas to liquify and being supplied to a liquid line 52, which is fed back through an evaporator (not shown) and via a line 54 to the air conditioning compressor. The evaporator is positioned so that air may flow thereover to transfer heat to the air stream 41. Cooled air or liquid is delivered to the cab of the vehicle for cooling the interior of the cab for the driver and any passengers' comfort. The cooling air stream 41 flows past the condenser 50 and through a shutter 60 and is delivered to the radiator 20 where it cools the liquid coolant in the radiator to keep the engine cool.

The rate at which the engine 12 is effectively cooled as well as the rates at which the intercooler 38 and the air conditioning condenser 50 are cooled is controlled to some extent by the rate at which the fan 24 turns to cause air flow. In the event that the vehicle 10 is moving at high speed down the road, a ram air stream 41 flowing through the intercooler 48, the air conditioning condenser 50, the shutter 60 and the radiator 18, and keeps the engine adequately cool. It is usually unnecessary in that circumstance to maintain the fan operating.

The operation of the electromagnetic clutch and of the fan may be precisely controlled depending on a number of operating conditions or parameters by the control circuit 30. The control circuit 30 includes a microprocessor 70, having a data bus 72 and an address bus 74, which operates off a stored program and a read-only memory 76. The read-only memory 76 could have any other type of non-volatile or backed up store, such as an EAROM, EPROM or battery backed up CMOS ram or the like for storing the program contents. The program is executed in the microprocessor and transitory and variable values may be stored in a random access memory 78 connected to the data bus 72 and to the address bus 74. In addition, a separate EEROM can be supplied for storing in non-volatile format set points, limits and other data which should be held in the controller 30 even when the circuit 30 is not receiving energizing power. The microprocessor sends data commands through a digital to analog converter 80 coupled to the data bus 72 and the address bus 74, which provides an analog output to a clutch output drive circuit 82 for supplying current to the electromagnetic clutch 26. That current is modulated under the control of the microprocessor 70 to determine the degree of drive or slippage transferred from the output shaft to the engine 12 through the magnetic clutch 26 to the fan 24.

The amount of electrical energy or current supplied to the magnetic clutch 26 is governed in part by the rate the vehicle is traveling as indicated by a speedometer 90 which supplies a varying signal indicative of the speed of the vehicle to a pulse-shaping circuit 92, which then feeds pulses at a predetermined rate to the microprocessor 70 along the data line 72. Those pulses are timed by the microprocessor to determine the rate of speed of the vehicle at any instant. If the vehicle is traveling at a high rate of speed, the microprocessor will simply cause the data channel to feed all zeros to the D to A converter 80 which commands the clutch output circuit 82 to supply no current to the magnetic clutch 26, allowing the magnetic clutch to be free-wheeling. In the event that the vehicle is not moving, and the engine is warm the microprocessor will cause the magnetic clutch output to provide sufficient current on the line 83 so that the magnetic clutch is locked up, and the magnetic clutch draws a maximal amount of mechanical energy from the output shaft 28 so that adequate air flow is supplied through the intercooler 38, the condenser 50 and the radiator 18 to maintain the vehicle engine cooled. In an electric motor, the magnetic field is switched or rotated at the electromagnets to cause the pole pieces to rotate. Rather, the magnetic field is not rotated electrically with the electromagnet clutch 26 described herein although the electromagnets are mechanically rotated.

The microprocessor 70 also receives an input indicative of the engine temperature from an engine temperature sensor 100 which is coupled connected to the engine 12 at the uppermost portion thereof to measure the coolant temperature. The engine temperature sensor 100 may, for instance, be an RTD or resistive-type sensor which supplies an analog output responsive to the temperature of the engine. The analog output signal is supplied on a line 102 to a temperature analog to digital converter 104 which supplies a digital temperature signal on a digital temperature bus 106 to the data bus 72, which is then transferred to the microprocessor 70. If the temperature of the engine is very high, the microprocessor will command the clutch output drive 82 to lock up the magnetic clutch 24, causing the fan to run at its maximum speed as driven by the output of the engine. This results in the maximum horsepower from the engine being used to drive the fan to provide the most cooling.

If the temperature is at an intermediate range and the speedometer 90 indicates that the vehicle is moving at intermediate range, a signal is sent over line 93 to the data bus 72 to the controller 30 and a modulated signal commands the clutch output circuit to provide less than the maximal current but more than a minimal current, will be supplied to the magnetic clutch allowing some slippage but not complete free-wheeling. Thus, a reduced amount of air flow will be used as will less horsepower from the engine for fan rotation.

Operation of the electromagnetic fan clutch 26 and the fan output is also effected by the condition of the turbocharger 14 and its intercooler 38. The turbocharger 14 is driven by exhaust gas on an exhaust gas line 110 which is connected into the turbocharger. A waste gate 112 which is connected to an electrical waste gate control line 115, may be positioned in an open or closed position. When the waste gate is closed, a portion of the exhaust will be circulated back into the inlet air stream where the partially burned exhaust will be compressed along with clean air. This typically occurs when the engine is very cold, as indicated by the signal from the temperature output sensor 100. A sensor 120 may also be provided on the intercooler 38 to send a condition signal, such as a temperature intercooler, signal over line 121 to the data bus 72 and to the controller. A sensor can be provided at the waste gate, if desired. This is done in order to avoid pollutants from only partially burned exhaust gases due to the cold engine from being dumped out the exhaust into the environment. The mixture of clean air and partially burned exhaust will then flow through the intercooler 38 and into the engine, where the partially burned hydrocarbons will be more completely burned. In the event that the engine comes up to a particular set point temperature, the microprocessor will then command through line 114 that the waste gate 112 close preventing any of the exhaust from being shunted into the inlet 34 of the turbocharger.

The microprocessor 70 also controls the position of the shutter 60 in response to its input signals. The microprocessor 60 forward digital shutter command signals over the data bus 72 to a shuttle control digital to analog converter 182. The converter 182 outputs a shutter control signal to an output circuit 183, which sends a control voltage over a line 184, to step the shutters 60 open or closed in response thereto. The shutters 60 are normally kept closed or partially closed in cold weather conditions to avoid wasted heat that would otherwise be supplied to the interior of the cab for the driver's comfort.

Figure 2:
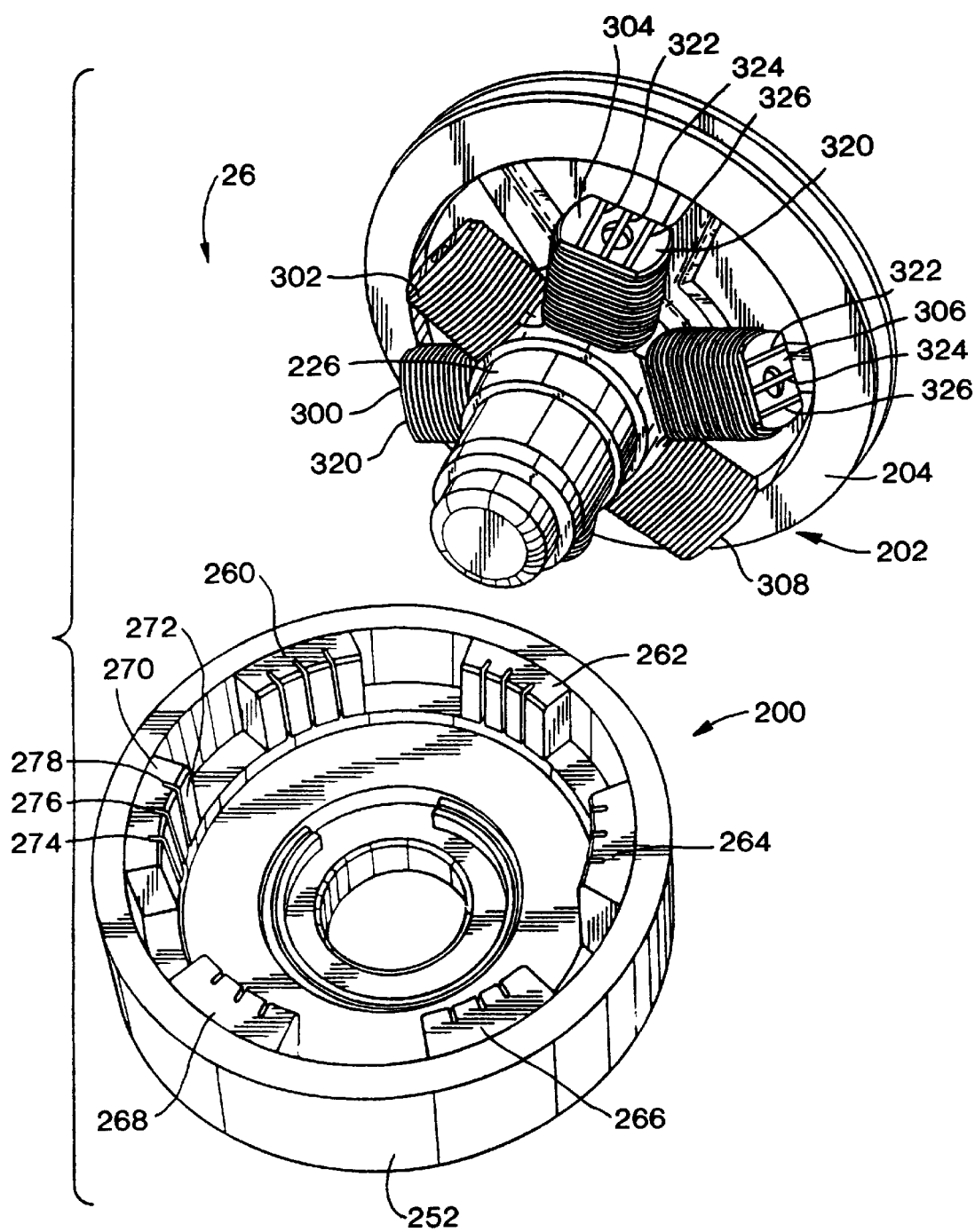
FIG. 2 is an exploded perspective view of an electromagnetic fan clutch shown in FIG. 1.
Figure 3:
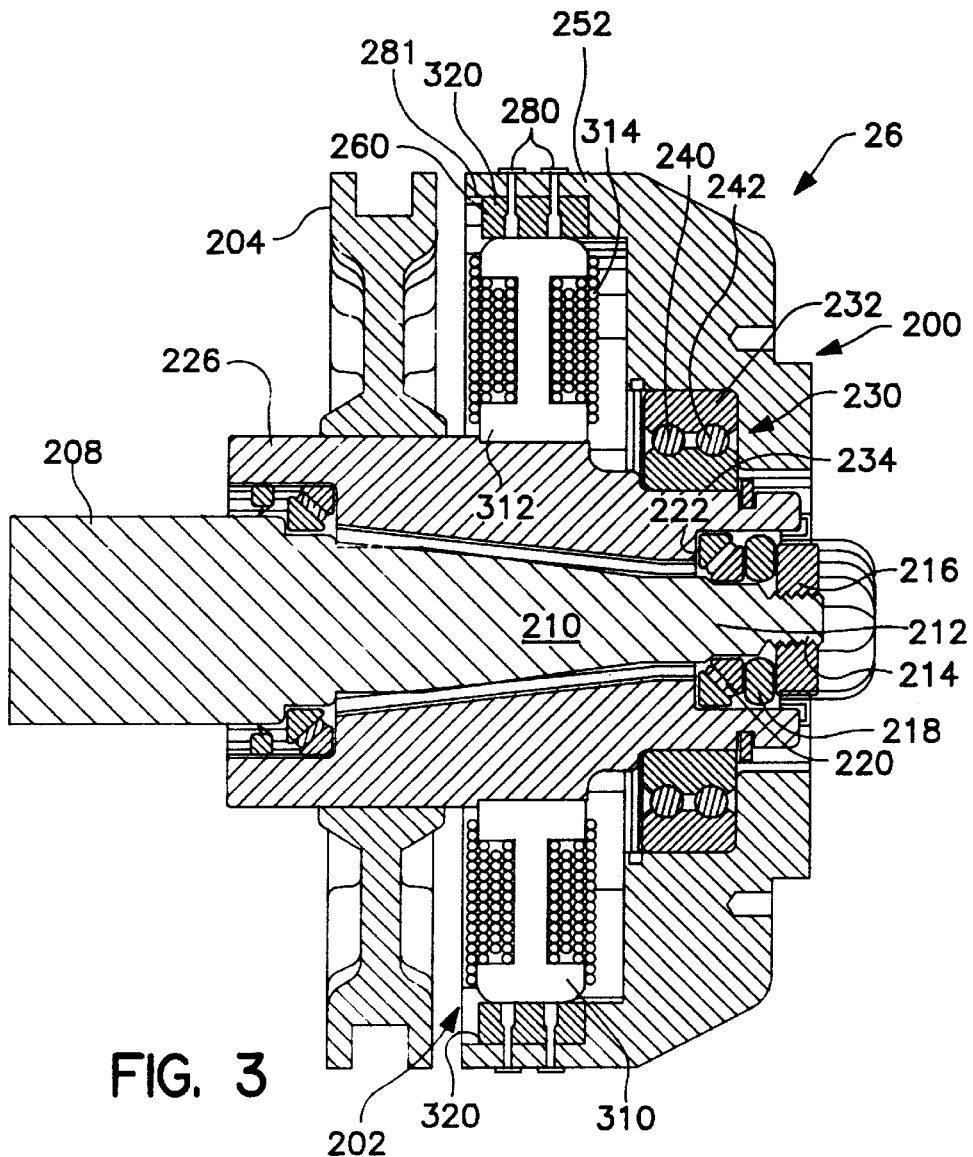
FIG. 3 is a cross-sectional view taken through the fan clutch and an input shaft to the clutch.
Figure 6:
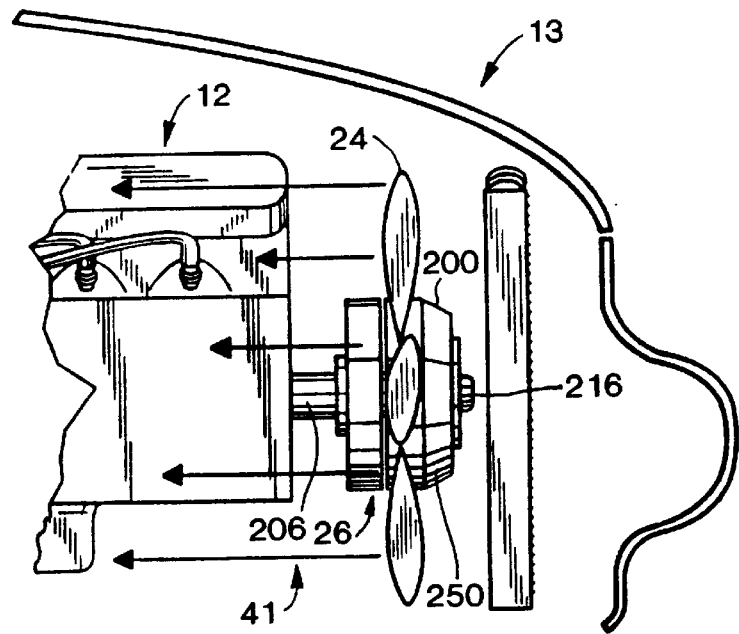
FIG. 6 illustrates the electromagnetic fan clutch of FIG. 2 directly mounted onto a crankshaft of an internal combustion engine.

Referring now to FIGS. 2 and 3, the magnetic clutch 26 is shown therein and includes a driven portion 200 and a driving portion 202. The driving portion 202 may, for instance, have a fan pulley 204 (FIG. 3) thereon for engagement with a fan belt 205 (FIG. 5) or may be directly coupled at a crankshaft output 206 (FIG. 6) of the engine. A mounting shaft 208 has a constant tapered section 210 and a varying or tapered section 212, ending in a threaded portion 214 which is engaged by a cap nut 216. The cap nut 216 is threaded onto the threads 214 and holds a washer 218 in contact with a thrust bearing 220. The thrust bearing 220 is seated against a shoulder 222 and holds a driving portion sleeve 226, which is rotatably mounted on the fixed shaft 208. A ball bearing 230 having a pair of bearing races 232 and 234 for respectively holding balls 240 and 242 rotatably mounts the driven member 208 on the driving member sleeve 226. The driven member comprises a cup-like member 250 ending in an outer wall 252 and having a plurality of pole pieces, which are substantially identical to each other respectively numbered 260, 262, 264, 266, 268 and 270 (FIG. 2). Taking pole piece 260 as being exemplary, it is formed with an arcuate or mating face 272 having three eddy current depressing slots 274, 276 and 278 formed therein. The face 272 defines a portion of an air gap with a respective solenoidal magnet on the driving element 202, as will be seen hereinafter. The pole pieces are fastened by pairs of fasteners 280 which hold the pole pieces to an outer ring or annular wall 281 of the cup-like structure 250. While in one embodiment both the pole pieces and the cup-like structure can comprise a metallic material with the pole pieces being ferro-magnetic and the cup-like structure being comprised of aluminum. In another construction having very low moment of inertia and lightweight, the cup-like structure may be comprised of plastic or a lightweight polymer. A ring of metal or wire is mounted on the plastic cup-like structure to provide a complete flux path between all of the pole pieces 260–270. The fan 24 is attached to the outer portion of the cup-like structure 250 (FIGS. 5 and 6).

The driving element includes a central hub portion 206 of the sleeve 226 with six electromagnets or solenoids 300, 302, 304, 306, 308 and 310 extending from the hub. As mechanical motion is developed by the engine, the magnets 300 through 310 are spun about the central rotational axis through the hub portion 206. Each of the magnets includes a center, ferro-magnetic section as exemplified by magnet 300 with the ferro-magnetic material being a soft iron core 312. Wound about the soft iron core 312 is a coil 314 which is energized by the current on line 83 from the clutch output driver 82. In the present embodiment relatively large amounts of maximal current can be conducted through each of solenoids up to 40 amperes providing a very large magnetic flux density at a face 320. For instance, of the solenoid 300 the face 320 is curved to match the curvature in the pole piece 260 at its face 272 and to define a narrow air gap therebetween. The face 320 has formed therein a plurality of eddy current preventing slots 322, 324 and 326.

During operation of the clutch, mechanical energy is continually being supplied by the engine to the driving element 202 either by a central crankshaft output 206 or via a fan belt pulley system 29. In the event that no current is passing through, the coils of the solenoidal magnets, the driven element 200 either stand still or free-wheels in the air stream in the radiators as a result of the force of the moving ram air impinging on the fan 24 to rotate the same.

Figure 4:
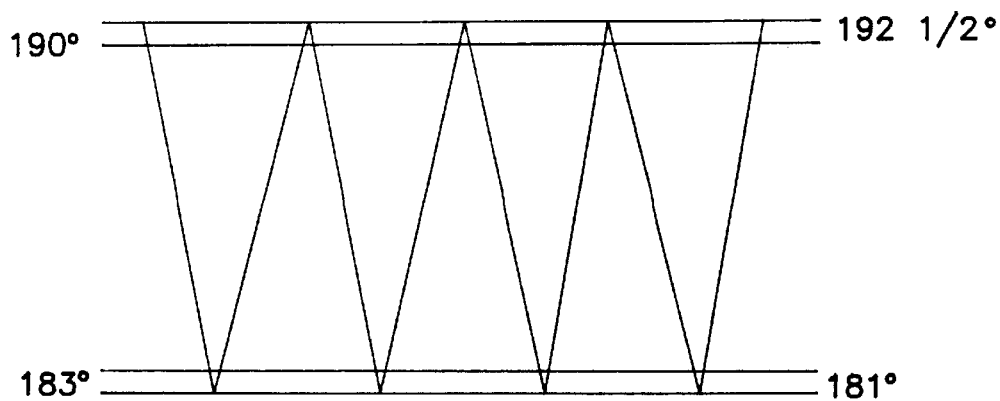
FIG. 4 is a view illustrating a typical temperature control curve for the temperature of the liquid coolant in an internal combustion engine.

As the engine, however, heats up (as mentioned above) in the conventional system, if a thermal switch is used to sense the temperature of the coolant, the switch may experience a dead band up to 11½° ranging from 181° to 192½° with nominal limits being at 190° and 183° F., as shown in FIG. 4. That dead band would lead to relatively imprecise control of the present invention, and accordingly, a RTD temperature sensor has been substituted therefor as exemplified by the RTD sensor 100. The sensor 100 supplies the temperature signal to the microprocessor 70 which then responds to that temperature signal as well as to the speedometer signal and the air conditioning load by commanding current to flow through the solenoids of the electromagnets causing a magnetic field to tend to attract the pole pieces 260–270 into alignment with the electromagnets 300–310. The amount of the current will be varied according to the thermal demands being placed on the system, as determined by the microprocessor. Because the amount of the current may be smoothly varied from zero current to a maximal current flow, for example 40 amperes, the amount of mechanical coupling between the output shaft 28 and the fan 24 may be varied from no coupling at all to complete or lock-up tight coupling. However, since the driven and the driving element do not frictionally engage each and, in fact, are connected only via a low friction bearings from the standpoint of normal clutch operation, there are essentially no moving parts to wear out. In addition, the degree of mechanical loading on the engine may be smoothly varied from zero loading with, in essence the consumption of zero horsepower from the engine, all the way to 40 or 80 horsepower at full lock-up depending on the size of the fan.

Figure 7:
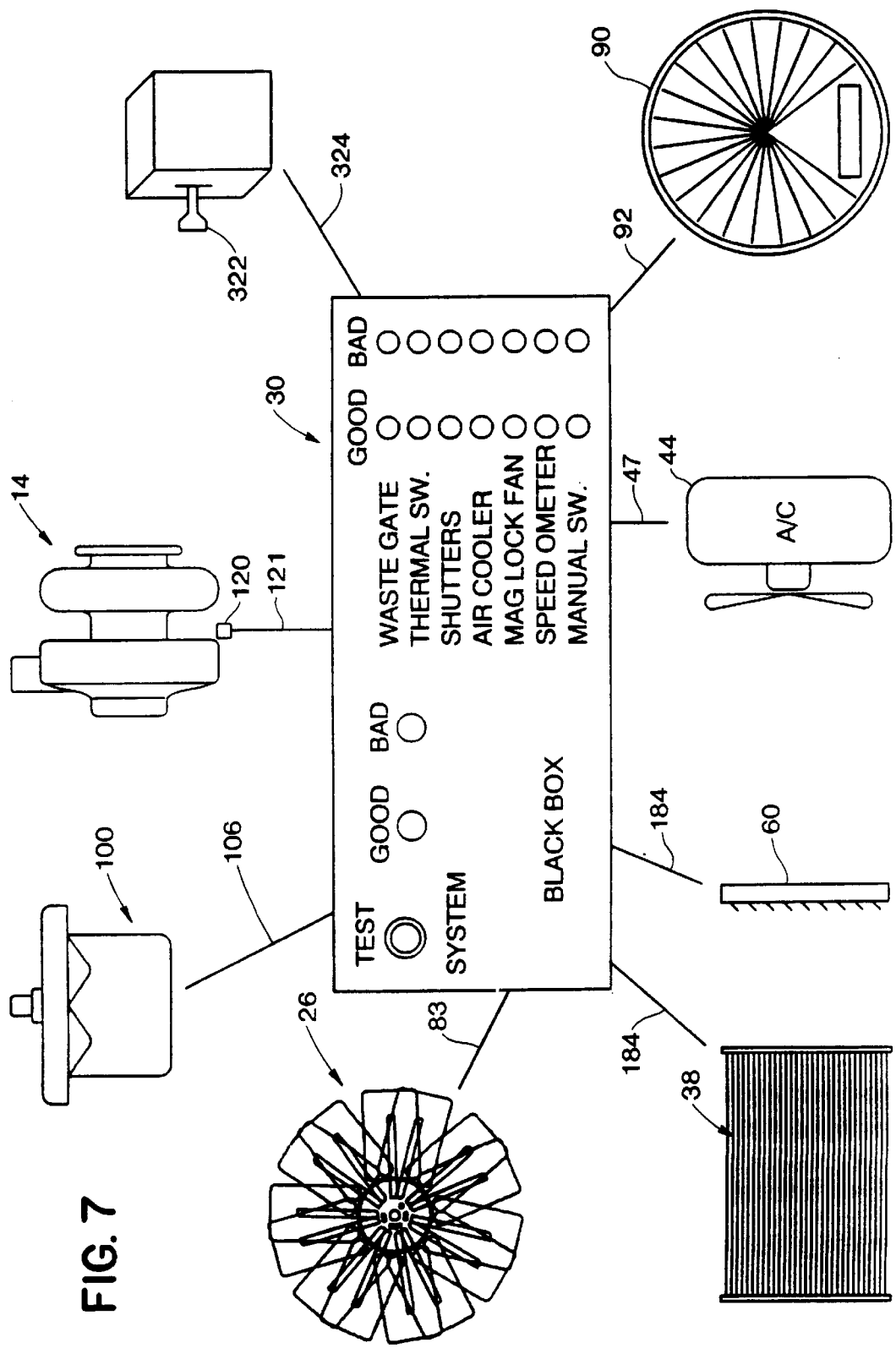
FIG. 7 is a diagrammatic view of a control panel for the electromagnetic clutch control system.

If desired, a manual override switch 322 (FIG. 7) may be used to override the controller 30 and to cause a full operation of the clutch to provide the maximum cooling by the fan. The truck driver may want to have or to be assured of maximum fan cooling, and he can throw the override switch 322 connected by line 324 to the electrical circuit operated by controller, if he so desires.

Because there is no direct mechanical engagement between the driving element 202 and the driven element 200, vibrations in the crankshaft 206 are not transmitted by the driving element which is separated by air gap 320 from the driven element. That is, the electromagnets may be vibrated with the crankshaft but the air gap 320 spaces the pole pieces 260–270 from rubbing or physical contact with the electromagnets. Hence, the crankshaft vibrations do not cause a rubbing or other relative movement between the electromagnets and pole pieces; whereas, such rubbing does occur between engaged clutch faces, as in the prior art clutches described above. With electrical power at a very low or no current, the pole pieces will not be magnetically attracted to follow the rotating magnets and no horsepower will be used to turn the fan. At full current to the electromagnets, the magnetic field will be strong enough to maintain each of the pole pieces aligned with a corresponding electromagnet. With an intermediate amount of magnetic field between the electromagnets and the pole pieces, the pole pieces rotate much slower than the electromagnets using less horsepower than when there is no slippage. The driving of the driven element 200 by the driving element is solely by the magnetic field which may be modulated by the controller 30.

The controller 30, the electromagnetic clutch and the sensors of various operating conditions and parameters, some of which are described above, allow a better and more fuel-efficient control of the engine cooling fan. The invention may be used on stationary internal combustion engines as well as on vehicles which may be trucks, automobiles or the like.

Another embodiment of the invention will now be described in connection with FIGS. 8–14 wherein there is disclosed a magnetic fan clutch system 410 (FIG. 8) such as may be used with an internal combustion engine 412 (FIG. 11) used with vehicles such as a truck or heavy equipment vehicles such as a bulldozer, backhoe, farm tractor, etc. or with stationary power plants having an internal combustion chamber such as a diesel engine or other type of engine which drives a large fan for cooling. In the heavy equipment area, the current fans are connected directly to the water pump and are driven continuously and are not provided with a fan clutch. The fan clutches currently used on trucks in the United States require compressed air to engage clutch frictional faces; but there is no compressed air available on heavy duty, slow moving equipment to operate such a fan clutch. In Europe and South America, a viscous fluid fan clutch is used and is operated by a thermostatic device having a bi-metallic, operated plunger which relies on heavy ram air flowing across the bi-metallic, thermostatic device for proper operation of the clutch. In slow moving, heavy duty equipment there is no such ram air pressure to allow the use of such a thermostatic switch device.

In accordance with the preferred invention, there is provided a magnetic fan clutch 415 which is formed with a magnetic field coupling a driving or pulley element 416 (FIGS. 12 and 13) which is molded of lightweight, strong plastic to a driven or fan cover 418 (FIGS. 8 and 9) which is made of lightweight, strong plastic in contrast to the heavy steel pieces used in the conventional ON/OFF clutches having engageable friction faces. In accordance with the preferred embodiment of the invention, there is a relatively slow, gradual torque transfer (i.e., a "soft engagement") of these plastic clutch elements which means that the clutch goes from OFF or no torque to full torque over a relatively long period of time, such as 6 seconds versus the sharp impact torque transfer pulse of the ON/OFF frictional faces of a clutch which typically transfer from zero to full torque over a period of about 1.2 seconds. This faster pulse transfer of torque of the common ON/OFF system necessitates the use of metal parts to withstand the loads and also applies high torque loads to the bearings and to the fan belt which decreases substantially their respective lives. Because of the more gradual torque transfer of the magnetic clutch, it is able to be made with lightweight, plastic materials rather than the heavy steel materials.

Figure 12:
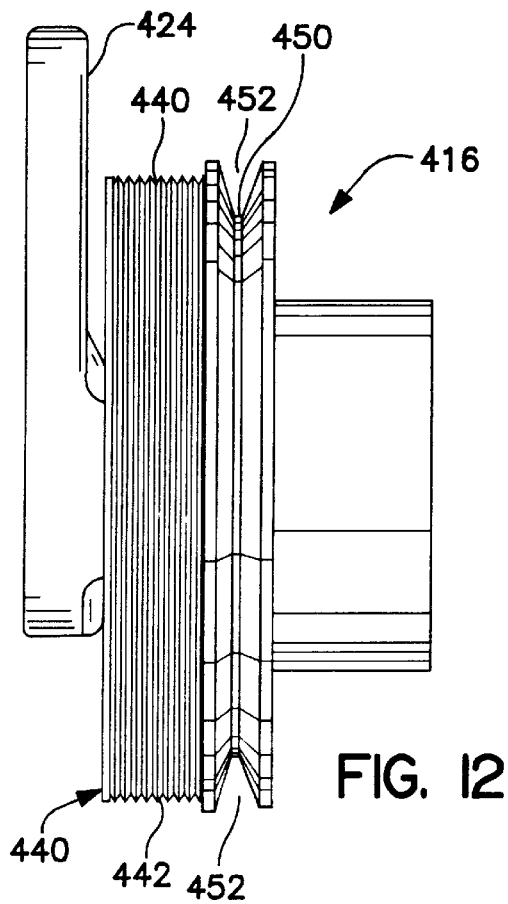
FIG. 12 is a side elevational view of a mounting plate with a plastic molded pulley for the magnetic fan clutch of FIG. 9.

In accordance with the preferred embodiment of the invention, an engineered, molded plastic, mounting bracket 424 (FIGS. 12 and 13) is used to mount the fan to the engine 426 rather than the heavy steel bracket of the prior art. The driven cover element 418 (FIG. 9), which carries magnetic elements 429, is also made of engineered, molded polymer plastics. Likewise, the drive or pulley 416, shown in FIG. 12, is made of molded plastic and carries electromagnets 428 which co-operate the magnetic elements 429 to couple the fan blades 420 and cover to rotate when the pulley 416 is rotated. Because these elements are molded to size and relative precise dimensions with stop or reference shoulders thereon, it is possible to eliminate many of the secondary machine operations used to machine the steel parts to size or dimensions in conventional fan clutches. The preferred engineered plastic material is nylon filled with glass to provide greater strength.

Figure 13:
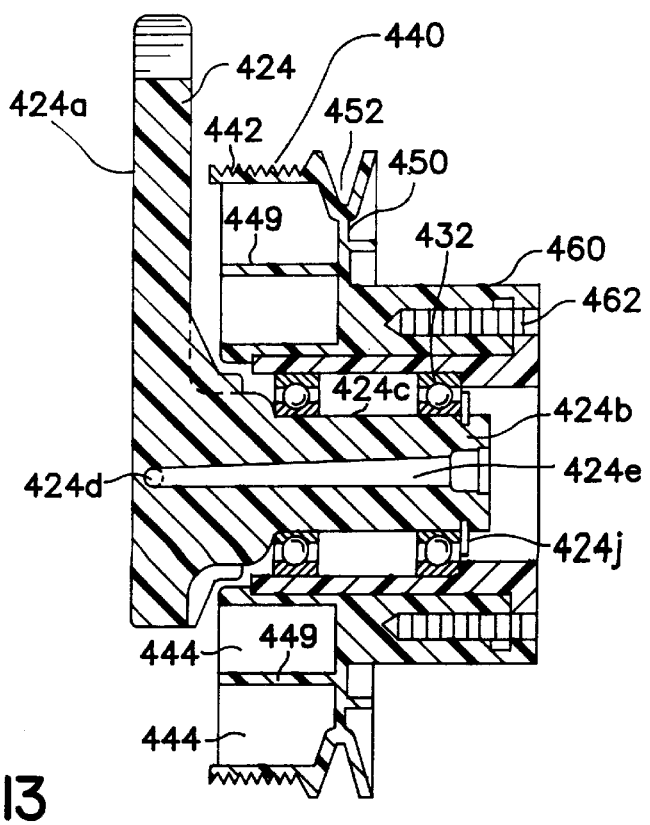
FIG. 13 is a cross-sectional view of the mounting plate and plastic pulley of FIG. 12.

In accordance with another important aspect of the invention, the driving pulley 416 and the driving fan cover 420 are provided with ribs or cooling fins which are rotated to stir the air and to transfer heat from their respective supporting parts to lower the temperature of their bearings 432 and 493 (FIGS. 7 and 13) in order to improve the life of the bearings. Air stirring ribs 456 (FIG. 15) act as fan blades to stir air on the molded sleeve to transfer heat from the sleeve and its bearings 432 (FIG. 13). The cover 418 has ribs 478 and 486 (FIGS. 21 and 4) to stir the air and transfer heat from the cover and its supporting bearings 493 (FIG. 8).

Figure 18:
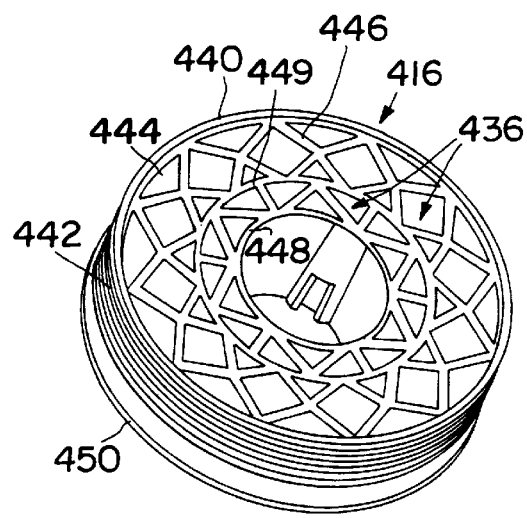
FIG. 18 is a perspective view of the pulley element of FIG. 17 showing the opposite side thereof.
Figure 21:
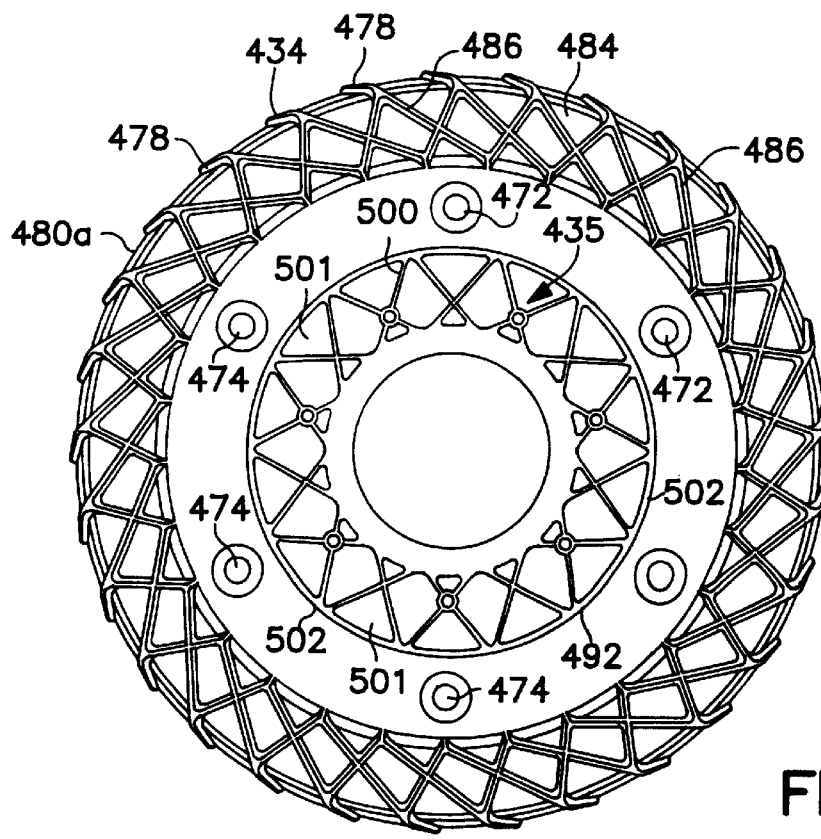
FIG. 21 is a front elevational view of a molded plastic cover element constructed in accordance with one embodiment of the invention.
Figure 22:
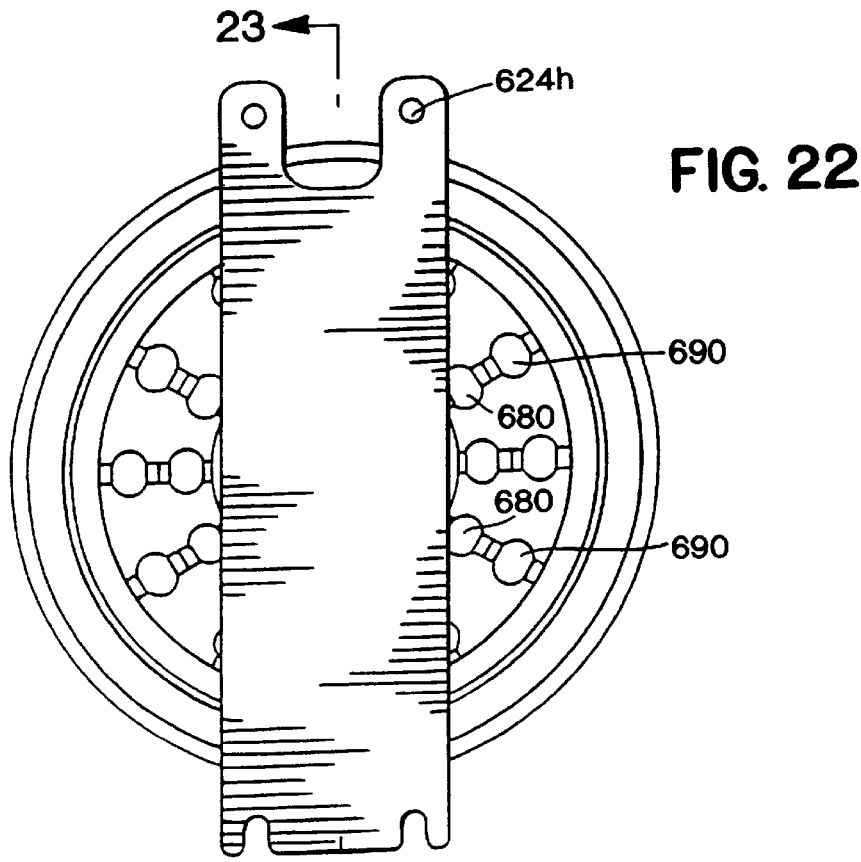
FIG. 22 is a front elevational view of a mounting plate and a magnetic fan clutch having a generator and constructed in accordance with a second embodiment of the invention.

Additionally, the molded, plastic pulley 416 and fan cover 418 are preferably made with a ribbed, honeycomb construction which provides a lighter weight piece than a solid piece and provides large surfaces to transfer heat from the plastic to the ambient air. More specifically, the cover 420 is shown in FIG. 21 with a honeycomb section which is identified by the general reference character 435. The pulley 416 is provided with large honeycomb sections 436, as best seen in FIG. 18. Thus, both the cover and sleeve have lightweight honeycomb sections with large surfaces to radiate heat to surrounding air and fins on rotating parts to transfer heat by convection and to dissipate heat into the ram air.

In the embodiment of the invention illustrated in FIG. 13, the fan clutch is similar to that described in connection with FIGS. 1-8 except that the parts are now made of an engineered mold plastic rather than metal and that the number of magnetic areas has been increased. In a third and preferred embodiment which will be described in connection with FIGS. 22–25, the fan clutch system is provided with a generator 435 which generates power for the magnetic fan clutch 415 and which absorbs heat and radiates air outwardly from the bearings, as will be explained in greater detail hereinafter. Thus, it will be seen that the fan clutch system, including the clutch itself and the generator 435, are constructed to dissipate heat to keep the plastic materials from being degraded by heat and also to improve the life of the fan belt and of the bearings.

As shown in the drawings, the electromagnetic fan clutch system 410 is mounted on the engine by a mounting bracket 424, which in this instance is formed of a nylon plastic available from BSAF Corporation located in the United States of America having about30% to 35% glass fill, and preferably 35% glass-filled by weight. The glass-filled nylon is very strong and will support the fan clutch system because the fan clutch pulley 416 and cover 418 are also made primarily of light weight engineered polymer materials and are formed with the honeycomb sections 435 and 436 This is in contrast to the conventional steel mounting brackets used in the prior art which were much heavier. As best seen in FIGS. 14–18, the molded plastic mounting bracket has an integral, flat plate portion 424a and a lower projecting nose or hub portion 424b with the bearings 432 being mounted on a cylindrical surface 424c of the hub. The bracket 424, shown in FIG. 13, includes a side bore 424d for an electrical lead coming in from a side of the plate 424a into a central bore 424e in the hub 424d for electrical wiring when a slip ring is used to provide power to the electromagnets 428 on the driven cover 18.

The mounting bracket 424 is shown in greater detail in FIGS. 14, 15 and 16 and includes a series of projecting ribs 424g radiating outwardly between the plate portion 424a and the hub portion 424c. The ribs 424g provide strength to the hub portion while reducing the overall weight from a solid portion of equal size. Preferably, the mounting plate is also provided with a series of apertures 424h for receiving bolts to mount a flat plate side 424i against the engine or other portion of the vehicle. A molded shoulder 424j at the end of the small diameter portion of the hub serves as a stop for abutting the innermost side of the bearings 432. The other outer side of the bearing 432 will be held by a retainer inserted into a molded groove 424k (FIG. 13), encircling the outer distal end of the mounting hub 424c. This groove 424k, shoulder stop 424i, and bolt holes 424h can be formed fairly precisely by molding only without machining because the mounting bracket 424 is molded to size and dimensions whereas metal pieces would have to be machined to have corresponding surfaces and parts.

Referring now to FIGS. 11, 12, 13 and 17, the preferred and illustrated pulley 416 is formed to be lightweight, strong and to dissipate heat, not only by radiation but also by convection by causing air movement by its fins. It will be appreciated that the bearings 432 are mounted within the driving part 16 and that the heat generated by the bearings should be dissipated to prevent the bearings from being hot and having a lower life. The bearing life can be quite extensive in the present invention because of the light weight of the pulley and the bearing loads thereon and because the heat is dissipated to keep the bearing temperature low. If the heat is not dissipated, the life of the bearings could be substantially below the desired goal of 30,000 to 40,000 hours of operation, or up to 1,000,000 miles of operation for the life of the bearings 432.

Figure 11:
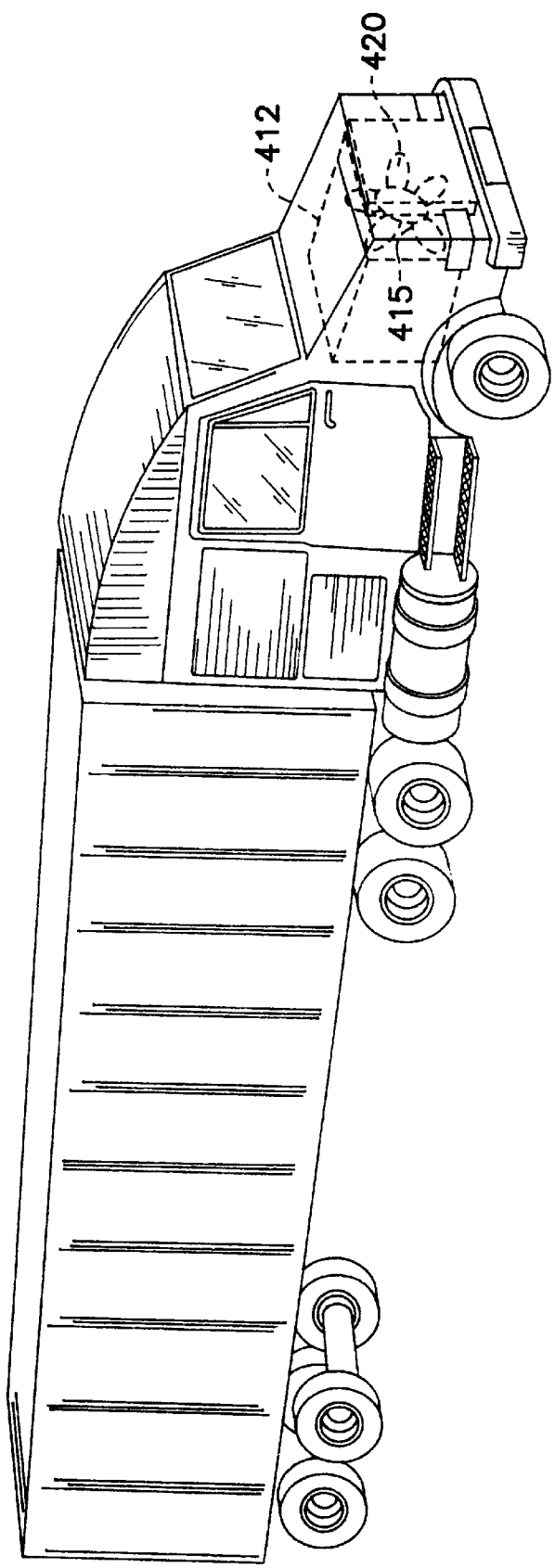
FIG. 11 is a diagrammatic view of a vehicle, such as a truck, having an electromagnetic clutch system embodying the novel features of the preferred embodiment of the invention.

The illustrated pulley portion has a rim 440 of cylindrical shape with a grooved peripheral surface 442, which is adapted to be engaged and driven by the fan clutch belt to rotate the driving sleeve 416 about an axis through the center of the mounting bracket hub 424c. The sleeve rim 440 is supported by the honeycomb section 436 which makes the pulley strong and lightweight and supports the forces at the rim 440 as well as sucking heat from the bearings. The honeycomb section 436 is defined by a plurality of open spaces 444 of generally triangular shape formed between spaced ribs 446, as best seen in FIG. 11. In a smaller diameter, inner honeycomb section, the preferred ribs 446 are usually in the shape of triangles and extend outwardly between an inner cylindrical wall 448 and a second intermediate cylindrical wall. An outer honeycomb section is formed between the intermediate cylindrical wall 449 and an outer larger diameter wall 447 at the outer cylindrical rim 440. The honeycomb spaces 444 defined by the rib 446 extend inwardly and laterally for substantially most of the distance of and beneath the one rim's grooved surface 442 to an outer, larger diameter flange wall 450, as best seen in FIG. 13. The outer, larger diameter flange wall 450 has an integral deep V groove 452 therein, as best seen in FIGS. 12 and 13 for receiving a V-shaped drive belt driven by the engine.

It will be appreciated that the air which is flowing in and out of the spaces 444 between the ribbed triangles will cool the surfaces of the triangles and this provides a large cooling surface area for dissipating heat. The torque applied and the frictional contact applied to the outer surface by the belt also generates heat as well as does the internal bearing 432. The life of the belt is increased because the torque load is kept low as a result of the light weight of the pulley 416 and as a result of the temperature of the belt being kept from becoming very hot as would deteriorate the belt material.

The preferred pulley is likewise made of nylon with a 35% glass-fill and is available from BSAF Corporation, located in the United States of America. The nylon is a good dissipater of heat and the engineered plastic pulley can be molded to fairly precise dimensions without a large amount of machining in contrast to the machined metal pulley and driver portions of the commonly-used conventional ON-OFF fan clutches.

Figure 17:
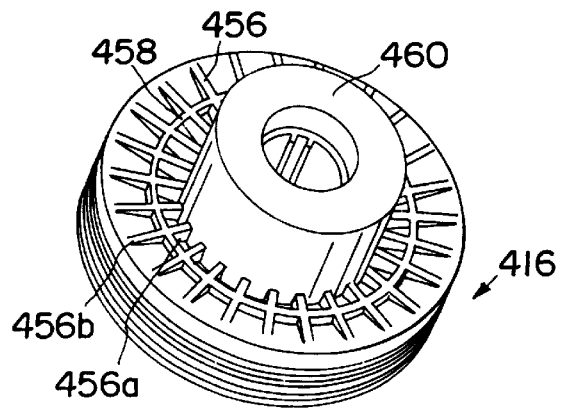
FIG. 17 is a perspective view of the pulley element showing a first side thereof.
Figure 23:
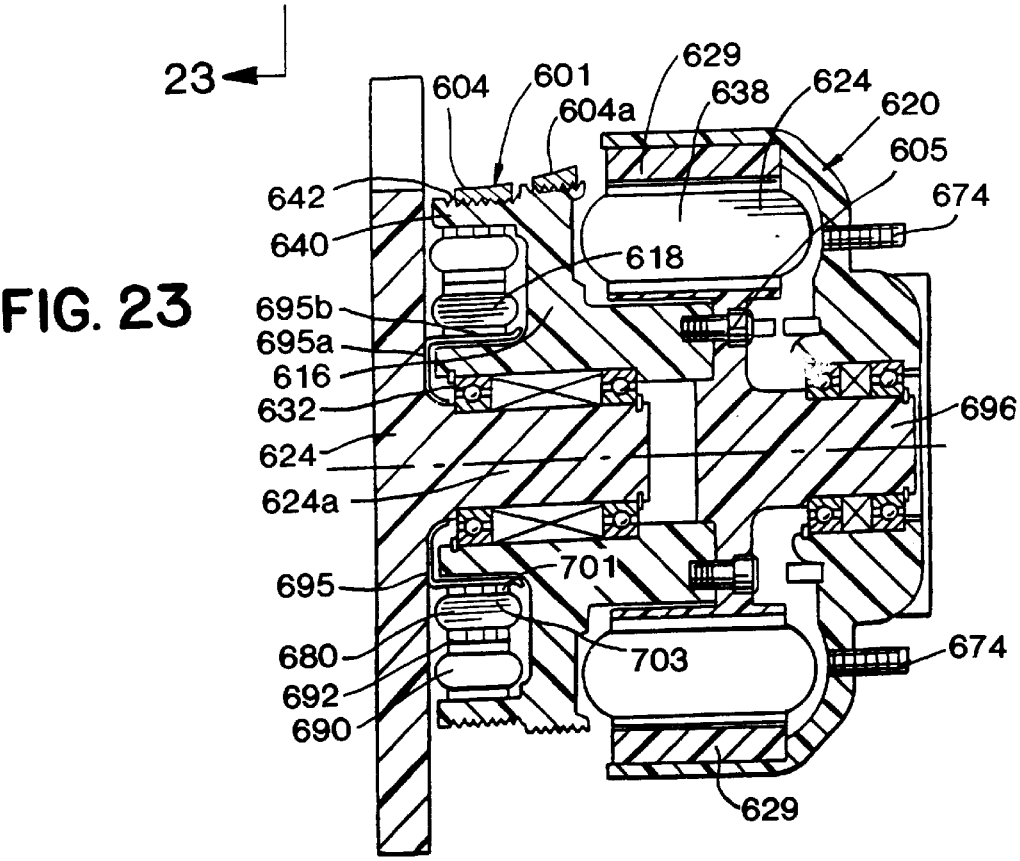
FIG. 23 is a cross-sectional view showing the fan clutch and generator with the mounting plate of FIG. 22.
Figure 24:
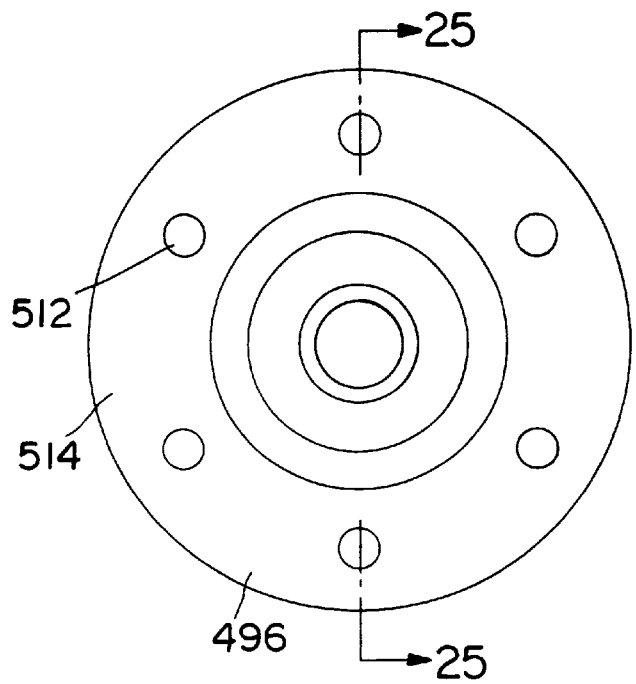
FIG. 24 is a front elevational view of a pulley extension used with the electromagnetic clutch of FIG. 23.

As the sleeve 416 is rotated, air is stirred in the honeycomb section 436 and heat is dissipated and drawn therefrom by radially extending ribs 456, FIG. 17, which extend from inner large end portions 456a at a projecting hub 460 through very small end portions 456b adjacent the outer rim flange 450. The ribs 456 are joined to one another by a central annular ring 458 molded integral with the ribs and with the flange 450. The projecting central hub 60 of the pulley 16 is integral with the larger diameter rim portion 440 and has a relatively thick cross section in the radial direction, as best seen in FIG. 13, to allow a series of holes 462 to be bored and threaded therein. The threaded holes 462, shown in FIG. 13, to receive threaded fasteners for attachment of a pulley extension 416a (FIG. 8), which will be described in greater detail hereinafter. The pulley extension 416a is fastened to the pulley and acts as part of the pulley as though integrally formed on the pulley piece. In FIG. 23, fasteners 505 are shown connecting a pulley and a pulley extension and similar fasteners would be threaded into the threaded holes 462 in FIG. 13 to secure the pulley extension 416a to the pulley 416 described immediately above.

From the foregoing, it will be seen that the pulley portion is very lightweight construction formed with the honeycomb walls to provide large open spaces and surfaces which not only provide great strength but allow the heat dissipation and that the radial ribs 456 act as fan blades to stir the air to cause additional heat convection away from the pulley as the pulley is rotated at high speeds, for example, up to 2400 RPM by the engine.

The rotating pulley 416 carries the set of first magnet elements, which in this instance, are electromagnets 428, which create a magnetic field and establish a driving relationship with magnetic field elements 429, preferably steel bars or members 429a, carried on the rotating driven cover 418 which is in the form of an annular cover having a ribbed shape and having the fan blades 420 attached thereto or integrally molded onto the cover. The preferred molded cover is lightweight and low cost with high durability and preferably is made of nylon which is glass filled by about 35% by weight. By way of contrast, the illustrated fan without the fan blades has a weight of slightly over 3 pounds, which is a weight reduction at least 5 pounds if the cover were aluminum. The illustrated cover has about a nine inch outer diameter and a width of about 4.125 inches and has nine fan blades 420. Manifestly, these sizes and dimensions can be varied. As previously described in connection with the mounting bracket 424 and the pulley 416, it is preferred that the cover be a precisely molded part to avoid expensive machining. The preferred magnetic elements 429 are in the form of steel bars 429a, as best seen in FIGS. 8 and 9, of rectangular shape which are molded in situ during the molding process of the cover so that the bars may be precisely positioned and held in place without the use of separate fasteners or machining to otherwise precisely locate them. The rectangular, bar-shaped magnetic elements 429 are spaced equidistantly from one another about the circumference of the cover. In the aforementioned patent application, six bars of steel were illustrated, and in this preferred and the other embodiment to be described hereinafter there are preferably twelve steel bars 429a as well as twelve electromagnets 428 on the pulley driving pulley 416.

The driving cover 418 is preferably provided with molded, in situ, threaded fasteners 474, as best seen in FIG. 21, to secure the fan blades 420 to an annular wall 476 of the cover, as best seen in FIGS. 8 and 9. It is preferred that heads 474a of the fasteners are molded in situ so that they are precisely positioned and will be held against turning so that only threaded fasteners need to be applied to the threaded shanks 474 when attaching the fan blades 420. The fan blades have broken off in these figures and naturally will extend to the desired length, e.g., to make a 32 inch diameter fan.

To pull heat away from the cover 418 as it is rotating, it is preferred to provide ribs on the cover including the outer ribs 478 which are integral with and extend across the outer cover rim 480 curved peripheral surface 481, as best seen in FIGS. 8 and 21. The ribs project radially outwardly from outer circumferential surface 480 of the cover rim, which also has a depending flange 482 at one side thereof against which is abutted one end of the steel bars 429a, as best seen in FIGS. 1 and 2.

To keep the outer rim wall of the cover strong yet fairly thin in cross section thereby reducing the amount and weight of plastic and also the amount of heat retained by the plastic, an inclined outer side wall 484 of the cover rim, as shown in FIG. 9, is provided with a series of strengthening, torque line ribs 486 which are integral with the wall 484 and project outwardly therefrom to define spaces 488 bounded by the ribs. The pattern of the ribs 486 is to extend along oppositely inclined intersecting torque lines so as to provide the requisite strength at the areas most stressed by torque when the cover is rotating the heavy steel bars 429a at high torque loads and high speeds generating substantial centrifugal force. At their upper ends, the torque line ribs 486 are joined to the outer peripheral ribs 478, as best seen in FIG. 3. At their inner ends, the torque line ribs 486 are joined to an annular flange or circumferential edge ring portion 490, as best seen in FIGS. 8, 9, 10 and 21, which carries the fasteners 474.

Figure 20:
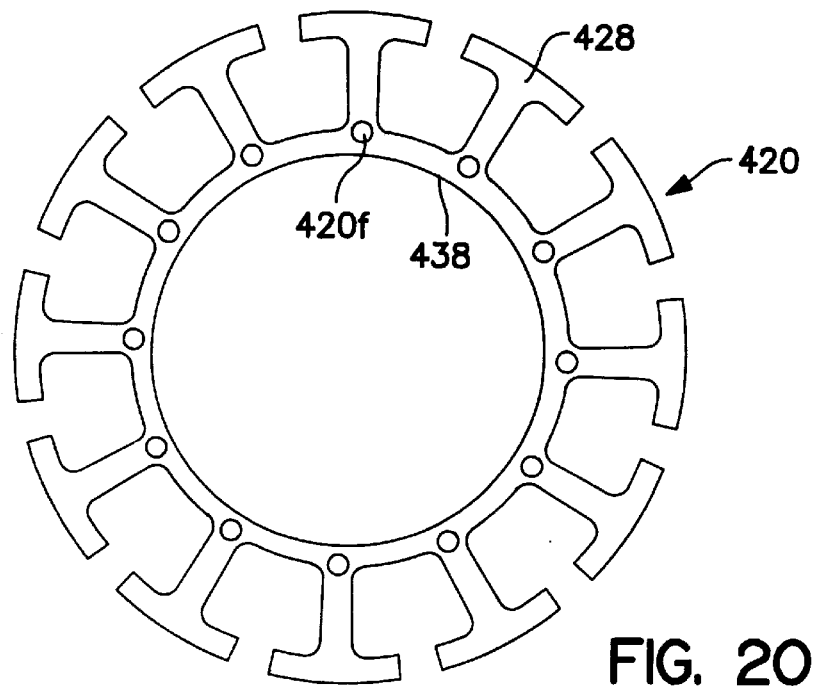
FIG. 20 is a plan view of a second plate used with the plate of FIG. 19 to form the posts for the c coils.

To dissipate heat and to make the cover lighter, it is preferred to provide a honeycombed central hub section 492, as best seen in FIGS. 21, 8 and 20. The inner hub portion receives a bearing 493, as best seen in FIG. 8, which is pressed into the hub section 492. The bearing has an outer bearing race 494. The bearing is held in position by an inner retainer ring 495 mounted in a groove 496 in the hub extension 416a. The inner side of the bearing 493 abuts an annular retaining ring 495a seated in an inner groove 496a (FIG. 9) on the cover 418.

Figure 25:
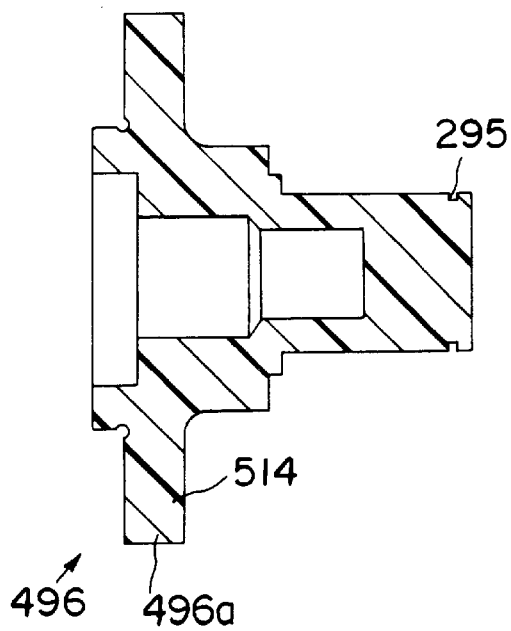
FIG. 25 is a cross-sectional view of the pulley extension taken along the line 18—18 in FIG. 24.
Figure 26:
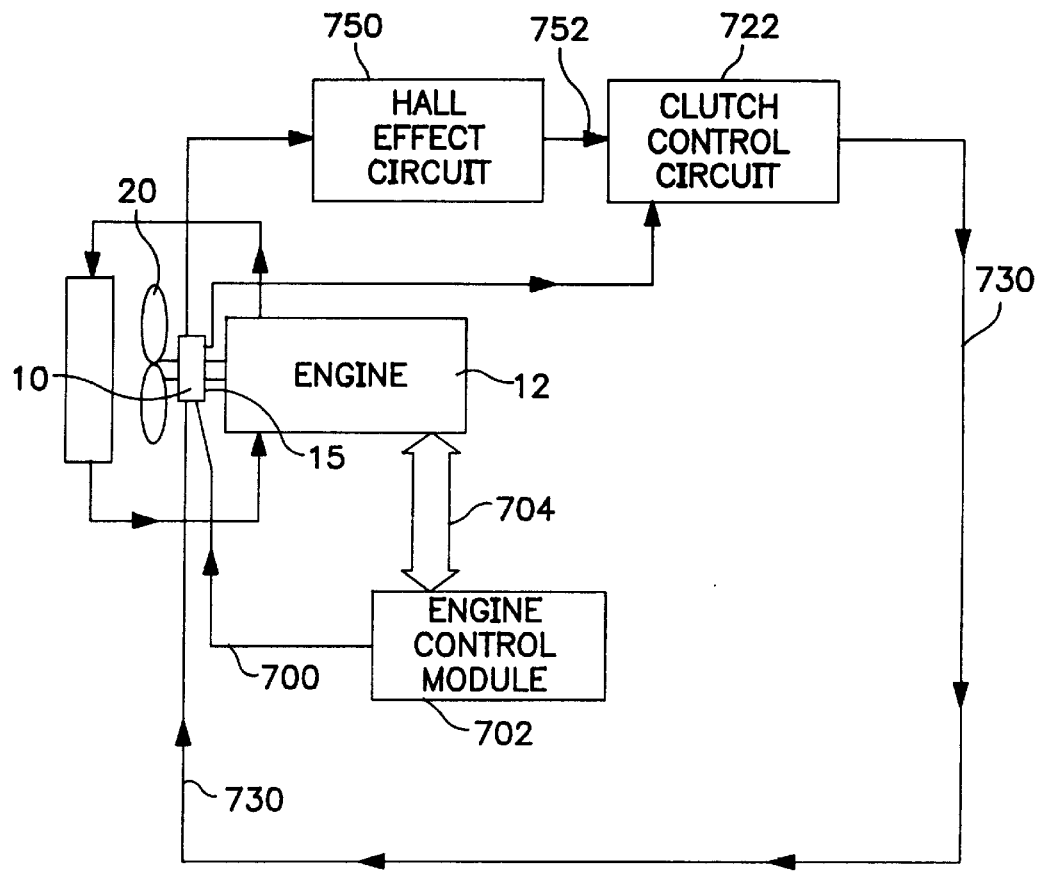
FIG. 26 is a block diagram of a vehicle engine in combination with the electromagnetic clutch and circuitry for controlling the electromagnetic clutch.

The central rotatable hub portion 492 of the cover 418, which is to carry the bearing 493 (FIGS. 8 and 9) has the honeycomb section 435 defined by ribs 500 (FIG. 14) which define the triangular-shaped spaces 501 about the hub to allow the withdrawing of heat from the bearing 493 to keep the bearing 493 at a relatively low temperature. The ribs and the open spaces of the honeycomb section provide the hub portion with less weight and more surface to dissipate heat than would a solid hub portion of the same dimensions. The hub portion 492 has an outer cylindrical wall 502 joined to the outer ends of ribs 500 and an inner cylindrical wall 503 joined to the inner ends of the ribs. The inner cylindrical wall defines a bearing seat and has a flange 504 to contain the outer race of the bearing. The pulley extension shown in FIG. 25 is an extension of a pulley 416 and is fastened thereto by fasteners inserted through bolt holes 512 in an outer flange 514 (FIG. 25) of the pulley extension 496. The fasteners are threaded into the threaded opening 462 in the hub 460 (FIG. 13). The hub extension is molded as shown in FIG. 25 with a groove 495 to receive the split ring 495a which holds the bearing in place on a nose cone portion 514 of the pulley extension 496. The hub extension is made of engineered polymer such as nylon with glass filling in the range of 30% to 35% to provide the strength and heat dissipation qualities needed. The bearing rotating on the nose cone portion 514 will generate heat. The pulley extension serves as adapter from the clutch to the pulley.

Turning now to the illustrated electromagnets 428, there are twelve of them which have a central core or posts 522 (FIGS. 19 and 29) about which are wound coils of wire 524, the coils 524 having been broken away in FIG. 8 to expose the posts 522.

Figure 19:
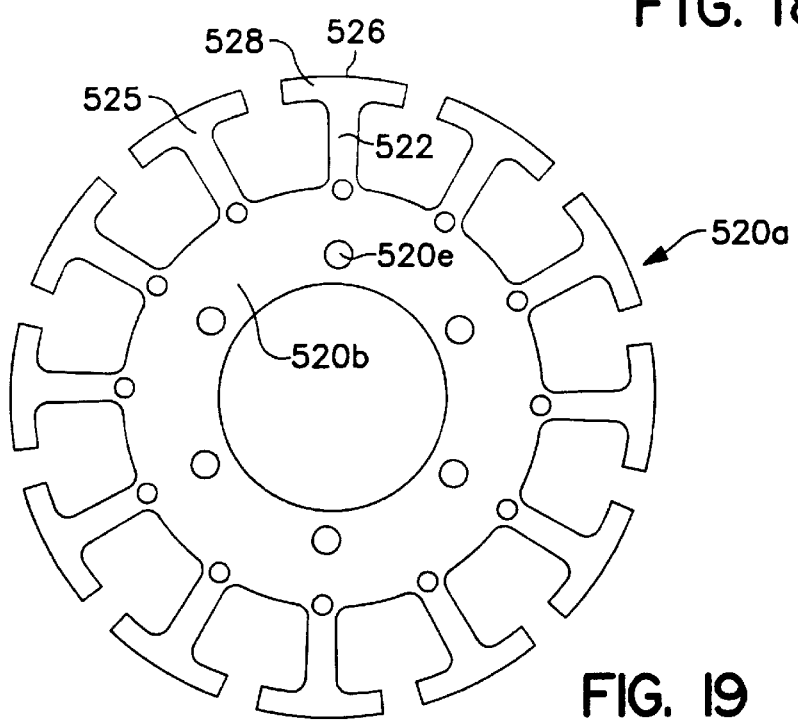
FIG. 19 is a plan view of a metal plate used to form the post for the electromagnetic coils.

In the preferred embodiment of the invention shown in FIGS. 8, 19, and 21, each of the cores or posts 522 for the electromagnets 438 is made with a series of eight, flat metallic pieces abutted one against the other. The posts 522 are radially extending, spoke-like portions 522a of rings 520 and 520a, shown in FIGS. 19 and 20, which are made of a metal such as steel selected for its good magnetic characteristics. One example is a 1008/1010 steel. This 1008/1010 steel is preferred because it is relatively inexpensive and can be obtained in flat sheets which can be stamped into the shapes shown in FIGS. 19 and 20. The eight abutting central electromagnetic soft iron core portions 522 are wound with a wire coil 524, FIG. 8. Relatively large amounts of current are conducted through each of the metallic conductors or coils 524 to provide a large magnetic flex density at a curved outer face 526 on a T-shaped end 528 which is connected to the post portion 522a, as best seen in FIGS. 19 and 20. The face 526 is curved to match the curvature of a curved face 429d of the steel bars 429a, as shown in FIGS. 8 and 9.

Figure 9A:
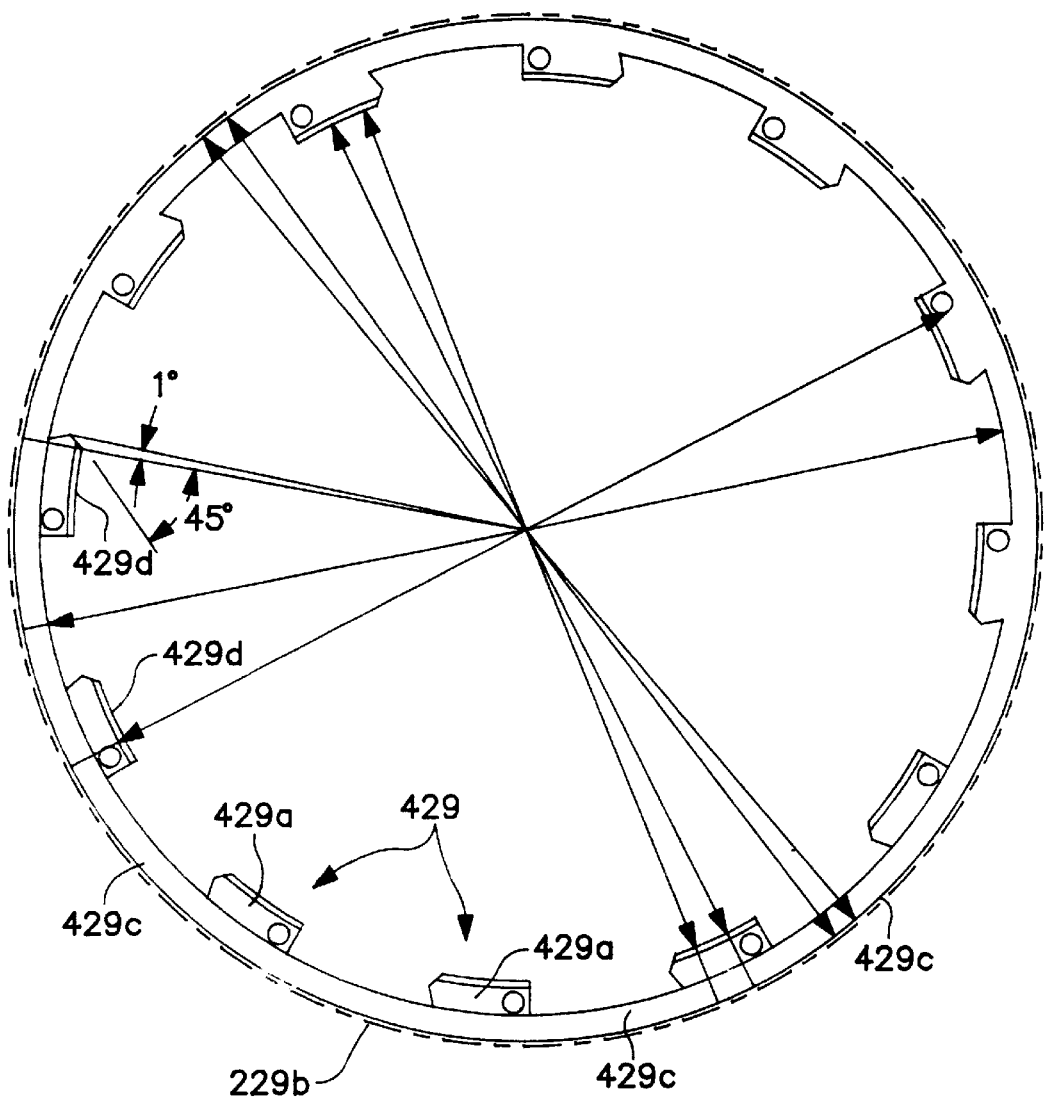
FIG. 9A is a plan view of a steel ring having magnetic bar elements spaced about its periphery.

The magnetic bars 429a may be interconnected and be portions of a steel ring 429b (FIG. 9A). The steel ring is preferably made of a magnetizable steel such as 1008/1010 steel. Small steel strip portions 429c on the steel ring are integral with the steel bars 429a. The magnetic bars 429a are thus spaced from each other by the integral strips. The bars 429a have inner faces 429d which define the air gap 525 with the faces 526 of the electromagnet coils 428. While the steel ring could be made in one piece having a width of about 2 inches, it has been found to be less expensive to stamp out a number of rings of 0.030 inch thick steel sheet and to rivet the steel sheets together to form a 2 inch thick steel bar 429a from a magnetic conductive laminate for the magnetic element 429.

A small, narrow air gap 525 is defined between the outer faces 429d and the faces 526 on the electromagnetic coils. The magnetic field flows across this gap to connect or clutch the cover 420 to the rotating sleeve. It is preferred that the electromagnetic clutch generate at least 180 newton meters of torque for the United States truck market, where the fan may have large fan blades up to 32 inches in diameter. A factor in the design of the magnetic clutch is that the torque curve rises very sharply, being more exponential than linear, from the torque needed for about 20 hp to drive the fan at 1200 RPM to the torque needed at 65 hp at 2400 RPM. In the preferred embodiment, about 600 wire coil turns are wound about each of the posts 122 to provide the desired flux density to achieve the 180 newton meters. The preferred 1008/1010 steel is a low carbon steel that is a good magnetic conductor and does not readily reach saturation for this application. It is desired to avoid permanent saturation. The width of the coiled poles is approximately 2.5 inches in width in this instance. With about 600 turns of 22 gauge wire on the post at 11 amps, there is provided about 4000 amp turns per each of the twelve electromagnets 28 provides the desired 180 newton meters of torque. There is a design constraint not only of material costs but also in the cumulative width of the magnetic fan clutch which is not to be wider than current existing, ON/OFF fan clutches so that the magnetic function may be fitted readily into the existing engines without having to change the size or location of the radiator or other parts adjacent or mounted on the engine. The magnetic fields that can be changed considerably from this illustrated example. Approximately only 120 newton meters is needed for driving the smaller diameter fans common in Europe, which use smaller fan blades and bigger radiators. In the embodiment described herein, the posts weigh about 0.8 pounds thereon, thereby totaling about 1.6 pounds, which will be turning at engine speed which may be at 2400 RPM. It is preferred to keep the wire coils within a rotating diameter of 10 inches so that the coil wires will not fly off the posts when rotating at high truck engine speeds.

In the illustrated embodiment of the invention, the coil metal rings 520 and 520a are shown in FIGS. 19 and 20, with there being six in coil plates 520 shown in FIG. 20 which have a larger diameter opening 538 which is sized to slip over the outer circumferential surface 496a of the hub extension 416a, shown in FIGS. 8 and 25. The metal rings 520a, shown in FIG. 19, are used to secure the coiled metal plates to a flange 499 on a flange 499 of the pulley extension 416a. The rings 520a have bolt openings 520e to receive bolts to secure the rings to the hub flange 499. When bolted to the hub extension 416a, the plates 520a have a smaller diameter inner surface 520b, is adjacent an annular shoulder 496b on the hub extension. Thus, the rings 520 and 520a are mounted with suitable fasteners to the flange 514 through the openings 512 which are aligned with the openings 520e for the flat metal ring 520a of FIG. 19 and for the apertures 520f for the metal plates 520 shown in FIG. 20.

Referring now to a second embodiment of the invention wherein the elements previously identified by reference characters have a prefix numeral 6 added thereto to distinguish these reference characters from the reference characters used in the previously described embodiment. The second embodiment of FIGS. 22–25 includes a generator 601 which serves to generate electrical power to be used to operate the electromagnets 628 which are opposite the magnetic elements 629 to generate a magnetic field across an air gap 625 between the electromagnetic pole pieces 629 and the magnetic elements. The magnetic elements 629 are made in the same manner as the magnetic elements 229 illustrated in FIG. 9A. Some manufacturers of vehicles do not wish to allow the taking of power such as, for example, 10 amps and 12 volts, from their existing power supplies to power the electromagnetic clutch and therefore the electrical generator 601 has been added to supply the power. The electrical generator 601 is driven by the vehicle engine through belts 604 and 604a (FIG. 23) which are meshed within the grooved surfaces 642 on a rim portion 640 of the driving pulley 616. The molded, plastic pulley 616 has affixed thereto a molded, plastic pulley extension 696. The molded, plastic mounting plate at 624 is similar to the molded, plastic mounting plate 24 shown in FIGS. 14, 15 and 16 in that mounting plate 624 has a flat plate portion which is to be mounted to the engine by fasteners through openings 624h. The mounting plate 624 has a central hub or post 624a carrying the bearing 632a which rotatably mounts the pulley driving member 616 which is being driven by the belts 604 and 604a. The electromagnet carrying pulley incurs a pulley-extension portion 696 fastened by fasteners 605 to the driven pulley portion 616. The pulley extension carries the series of flat post plates made of 1008/1010 steel, such as shown in FIG. 9. In a similar series of plates of ferro-magnetic material such as 1008/1010 steel are used to form the posts for the inner and outer coils 680 and 690 which are separated by an air gap 692, as shown in FIG. 23.

In the embodiment shown in FIG. 23, the electrical generator inner electromagnets 680 are supported by a stationary metal bracket 695 which has a vertical portion 695a fastened to the mounting plate 624 and has a horizontal portion 695b which supports the inner rings and the coiled wires 698 about the flat metal rings to form the inner pole pieces 680. The outer electromagnetic coils 690 are secured to the inner side of the rotating sleeve 616 and include metal rings or plates 701 which are wound about by wires 703 to form the inner pole pieces 680. A trickle current of, for example three amps for producing the generator field, is applied to the coils wound about the inner pole pieces 698. The trickle current is supplied over a generator trickle current line 700 from an engine control module 702 of conventional type. The engine control module 702 is of the type used to, among other things, control the hydraulic coupling through a hydraulic cooling fan of the type used on vehicles in Europe. The module 702 is able to produce a three ampere pulse width modulated current. The duty ratio of the pulse width modulated current is representative of the degree of coupling to be provided to the clutch. The characteristics of the pulse width modulated current are in response to various engine conditions sensed by signals supplied over a plurality of lines 704 connecting the engine control module 702 with the engine 12. The pulse width modulated current produces a variable flux density magnetic field within the generator which in turn controls the amount of current the generator will produce and send to the fan clutch coils and hence controls the amount of coupling, from 0% to 100% of the fan clutch.

Figure 27:
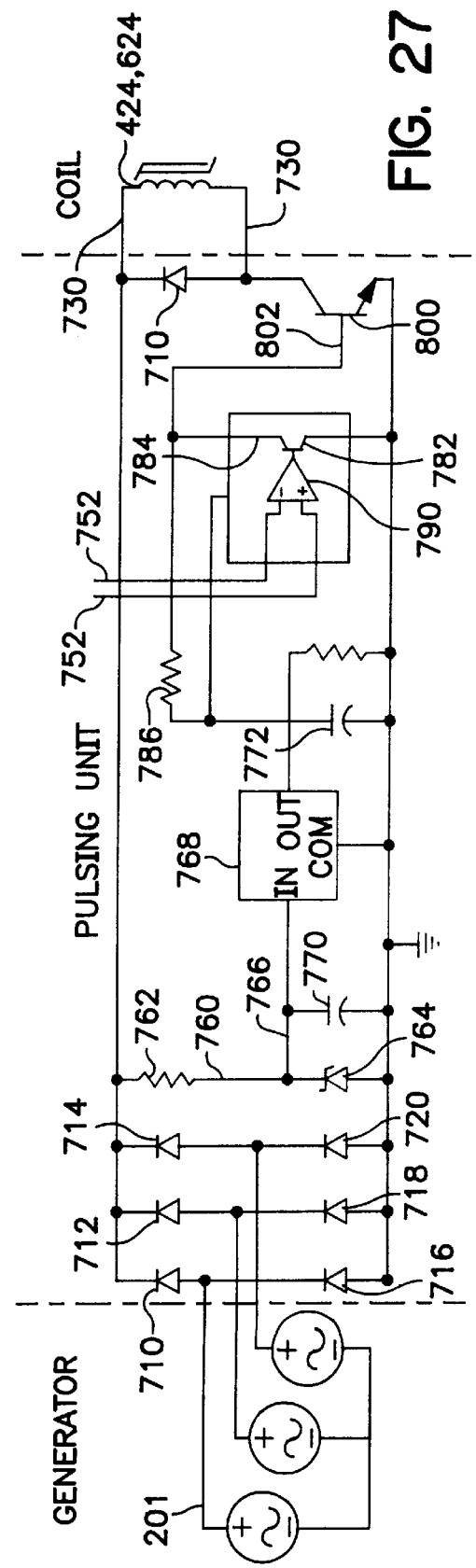
FIG. 27 is a schematic diagram of a clutch control circuit shown in FIG. 26.

Mechanical energy from the engine is applied through the belts 604 and 604*a* to rotate the sleeve and the outer pole pieces 690 to cause the generation of alternating current electrical power. The amount of current produced is dependent both upon the generator speed and the magnetic flux density of the magnetic field within the generator. A suitable rectifying device is carried on the rotating sleeve to rectify the AC current to DC current which DC current is then fed over conductors to the fan clutch coils (424, 624) of the electromagnetic elements (438, 638). The rectifying device (FIG. 27) comprises six diodes 710, 712, 714, 716, 718 and 720 which comprise a portion of a clutch control circuit 722 connected to be energized by the generator. The diodes also convert the three-phase alternating current form the generator to pulsing unidirectional or direct current.

The clutch control circuit 722 thus supplies current to the clutch coils 724 over a current carrying bus 730. The current, however, not only is unidirectional it is timed to provide maximum and smooth torque for any given current input. In order to do so it receives a signal from a Hall effect sensor 749, which is connected to a Hall effect circuit 750. The Hall effect circuit 750 supplies timing signals over lines 752 to a portion of the clutch control circuit 722. The Hall effect sensor 749 has rotating in its vicinity an adjustable, ferromagnetic gear or toothed wheel 751 having twelve equidistantly spaced teeth. Each tooth occupies 15° of angular displacement. The toothed wheel 751 has teeth with substantially vertical edges to provide accurate timing signals.

Figure 30:
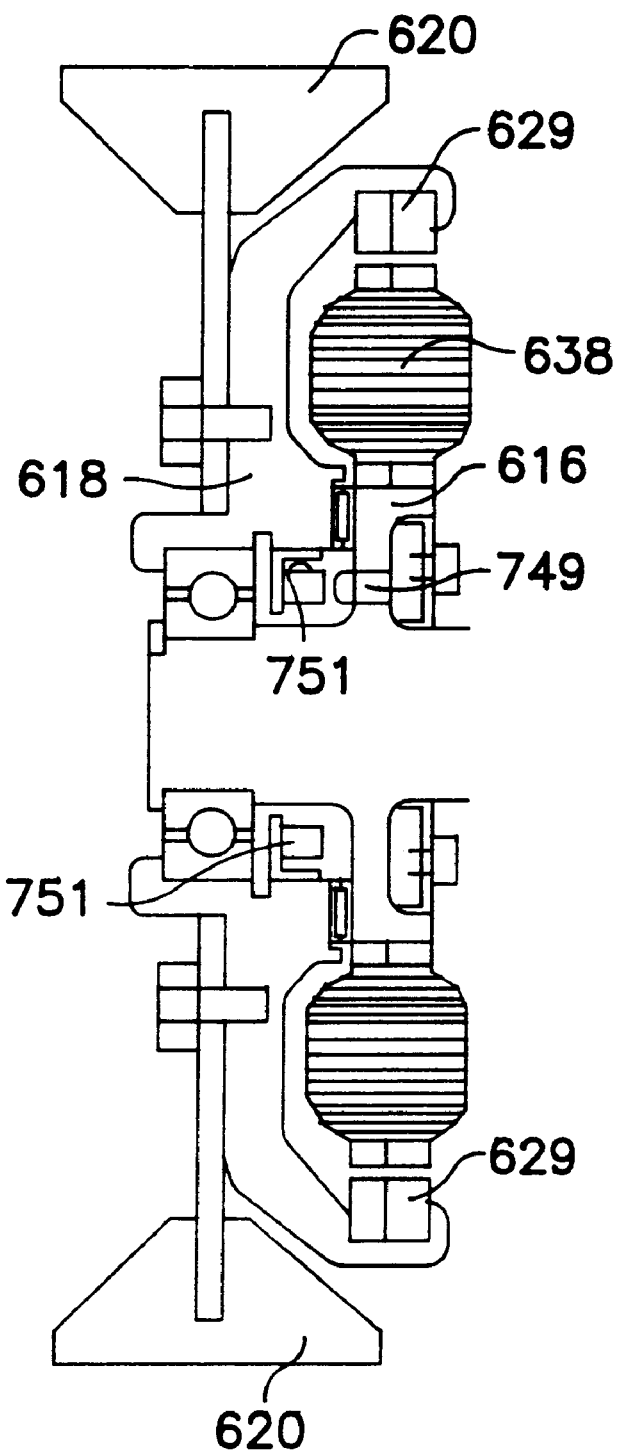
FIG. 30 is a partial view showing a gear ring mounted opposite a hall effect sensor.
Figure 31:
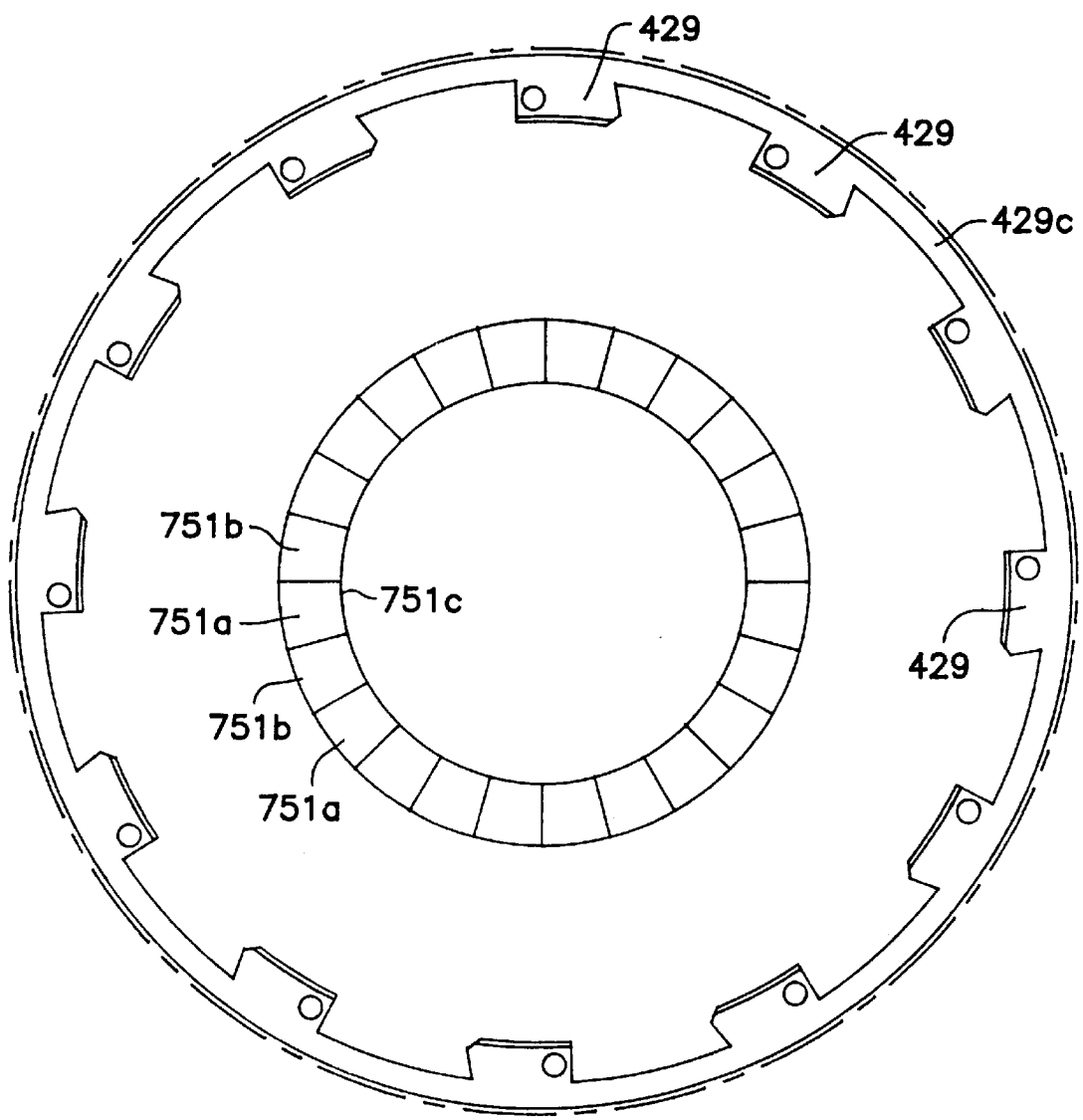
FIG. 31 is a view showing a gear ring mounted relative to an encircling pole piece ring.
Figure 32:
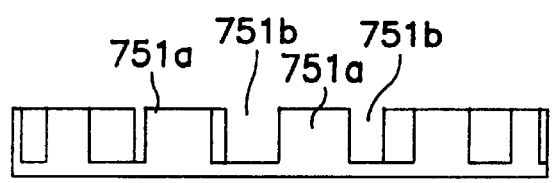
FIG. 32 is a front elevational view of a gear ring.

In the embodiment of the invention illustrated in FIGS. 30–32, the toothed wheel 751 is shown mounted on a fan cover element 618 which carries the fan blades 620 and the magnetizable metal posts 629.

The Hall effect sensor 749 (FIG. 30) is carried on the pulley 616 carrying the electromagnets 638. The gear ring 751, as best seen in FIG. 32 has projecting teeth 751*a* which are spaced by spaces 751*b* between the alternating teeth. Herein, by way of illustration only, there are twelve teeth which are about 0.45 inch in width at their radially inner surfaces 751*c* and the spaces 751*b* between teeth also occupy 15° in width and are about 0.45 inch in width. Manifestly, size, shape and number of gear teeth, as well as its overall structure, may be changed from that described herein.

The clutch control circuit 722 includes a first voltage regulator stage 760 comprising a resistor 762 and a Zener diode 764 rated at 24 volts. The 24 volt regulated signal is feed on a line 766 to a voltage regulator 768, which is an LM78L12ACM producing 100 milliamps of current at 12 volts. A filter capacitor 770 and a second filter capacitor 772 help to further reduce ripple. The 12 volt potential is fed to a resistor 780 which is connected to a NPN transistor 782 at its collector 784. The transistor 782 is driven by an amplifier 790 connected to the leads 792 for receiving the Hall effect signal. The Hall effect signal causes the amplifier 790 to provide an amplified and squared-up signal supplied as a switching signal to the transistor 782. That switching signal is then fed to an NPN transistor 500 at its base 802, which controls current flowing through the electromagnetic coils (424, 624) in response to the timing signals from the Hall effect circuit. A diode 810 is provided so that when current is quickly reduced or cut-off through the coils a decay current path is provided to avoid surge damage to the transistor 800. Thus, the system operates providing accurate timing for efficient torque application at a given current level of being able to modulate the torque to the generator set to provide highly accurate power transfer control to the fan clutch. Herein, the illustrated generator uses twenty laminated plates of 1008/1010 steel about 0.030 thick and about twenty-four turns of wire to supply about 50 volts and 8 amps for a magnetic fan clutch used on a large truck with a 32 inch fan. Thus, the rectified AC power being generated by the generator is applied to the fan clutch by the magnetic coil elements. The electrical generator can be constructed to generate 160 volts and 13 amps which is more than is needed to operate the clutch and this additional power can be sent to power other portions of the vehicle, such as lights. This is only an example of the electrical generator and clutch combination and the design and power can be changed substantially from that given herein.

The poles 626 of electromagnets 638 are energized for only a portion of the pole-to-pole travel depending upon timing signals sent by the Hall effect sensors 749 adjacent the poles. In addition, the pole pieces have been shaped to prevent unwanted torque reaction which can lead to cogging, as may best be seen in FIGS. 29 and 29*a*. Since all of the driving element pole pieces are energized and de-energized simultaneously and since the magnetic force is attractive between the driving element 616 and the driven element it may be appreciated that when the driving pole pieces 626 are moving more quickly then the driven pole pieces 629, that is when there are conditions of slip, there will be attractive components comprising oppositely directed torque components between the leading and trailing pole pieces and the neighboring leading pole pieces on the fan driven element 620.

Figure 29:
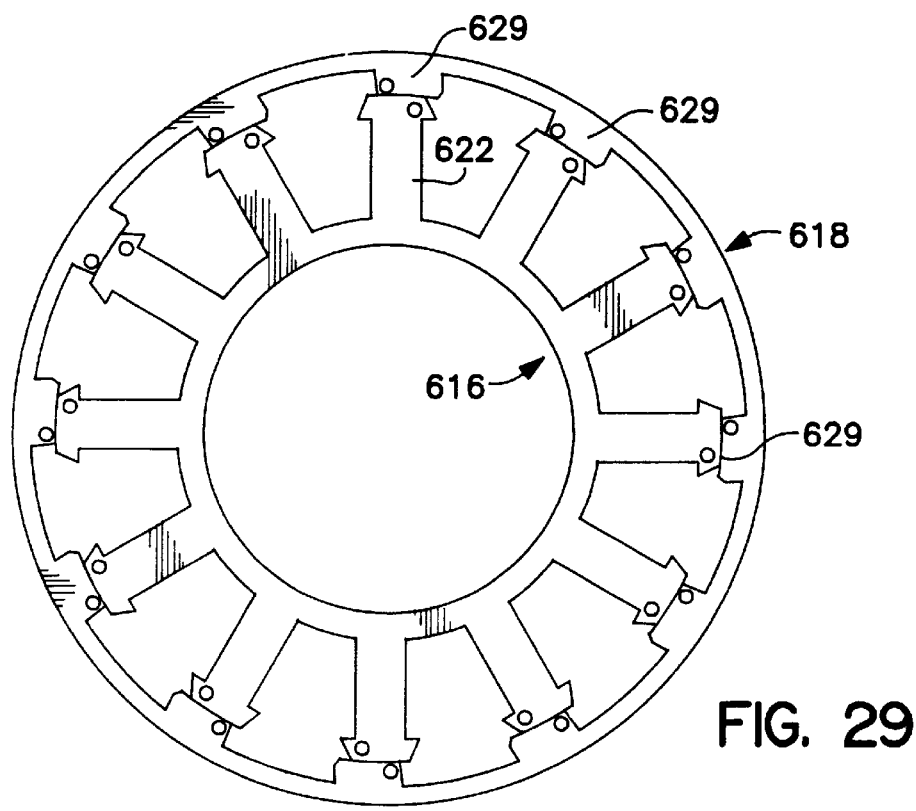
FIGS. 29 and 29a are plan views of a portion of the driving element and the driven or fan element showing details of the pole-piece faces.
Figure 29A:
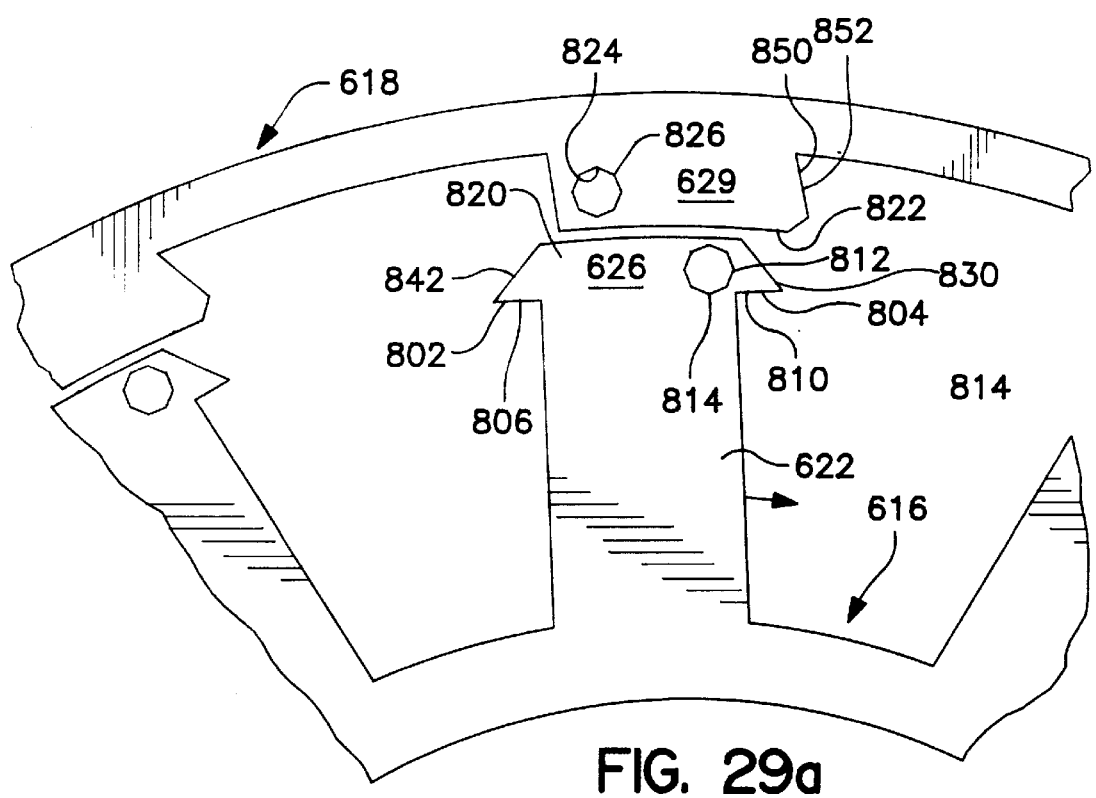

It may also be appreciated that, as shown in FIGS. 29 and 29A, as a driving pole exits 626 from beneath a driven pole 629 the attractive effect will tend to pull the trailing driven pole along, however, as the driving electromagnetic pole 626 approaches the next driven pole 629 with which it is to interact it will tend to draw that pole toward it with an opposite torque component tending to slow or cause cogging in the fan. This can cause chattering, cogging or uneven vibration which is unwanted. Thus, what is needed is to provide a timing system and pole pieces which maximize the trailing pole torque components, which are predominately attractive and while minimizing the oppositely directed attractive components. This is done by providing chamfering and spacing to brake the magnetic circuit to reduce the field strength at the leading portions of the pole pieces to prevent significant interaction from occurring prior to the driving pole piece 629 being in proximity with the next pole piece 626 which it is meant to engage.

Specifically, in order to control the magnetic field spatially, it may be appreciated that the post 622 terminates in the headpiece 626, which has a pair of angular tabs 802 and 804 formed thereon defining edges 806 and 810. The edges 806 and 810 retain the coil (not shown) on the post. In addition, the lamina which make up the post 622 and the edge 626 have an opening 812 formed therein which receives an aluminum rivet 814. Although in this embodiment, the rivet 814 is aluminum, any other material which is essentially non-magnetic can be used. Likewise, the driven element includes the post 629, which ends at a pole piece 822, defining an air gap with the pole piece 820. It too, includes an aperture 824 for receipt of an aluminum rivet 826 therein. It may be appreciated that as the driving element 16 rotates counterclockwise, as shown in FIGS. 29 and 29A, as the leading 830 of the driving post approaches the driven post 629, the average field strength will be relatively low due to the break in the magnetic circuit provided by the apertures 814 and 824 and the aluminum rivets positioned therein. This is helpful because it is desirable to cause the driven element 618 also to rotate in a counterclockwise direction, in order to prevent a substantial reverse torque from slowing driven element 618 in its clockwise travel. Contrariwise, as a trailing edge 842 of the post passes near a trailing edge 850 of the post 629, the magnetic field is locally enhanced due to the fact that an edge 852 extends at an acute angle with respect to the ring of 618 providing additional material to extend the low magnetic resistance path closer to the post 622 in order to enhance the attractive effect between the two trailing edges.

Figure 28:
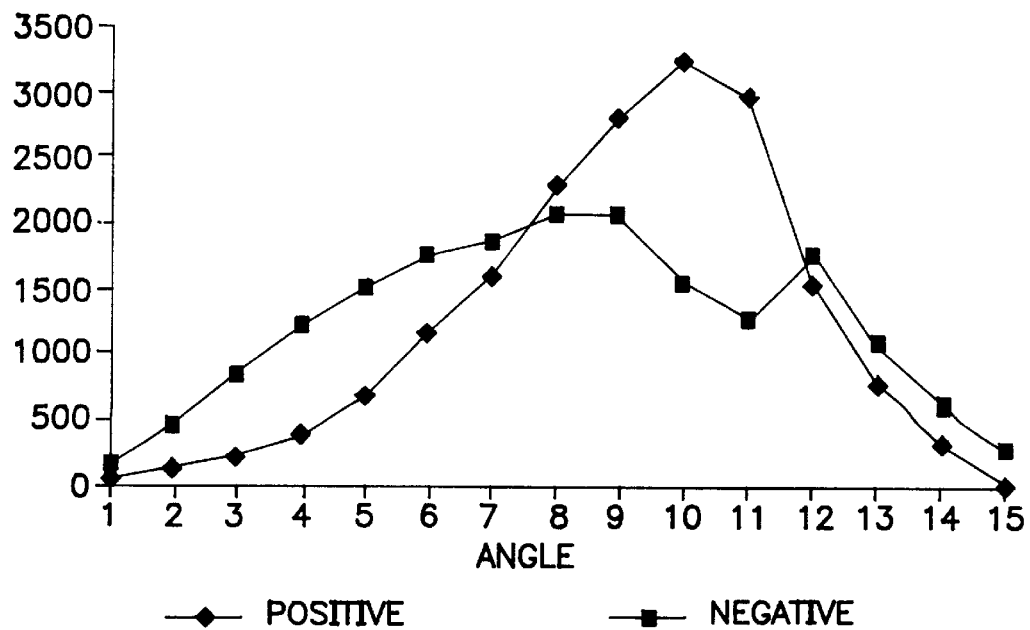
FIGS. 28 and 28a are graphs showing the relation between pushing and pulling torque components and the relative angular position of the driving element and the driven fan element.
Figure 28A:
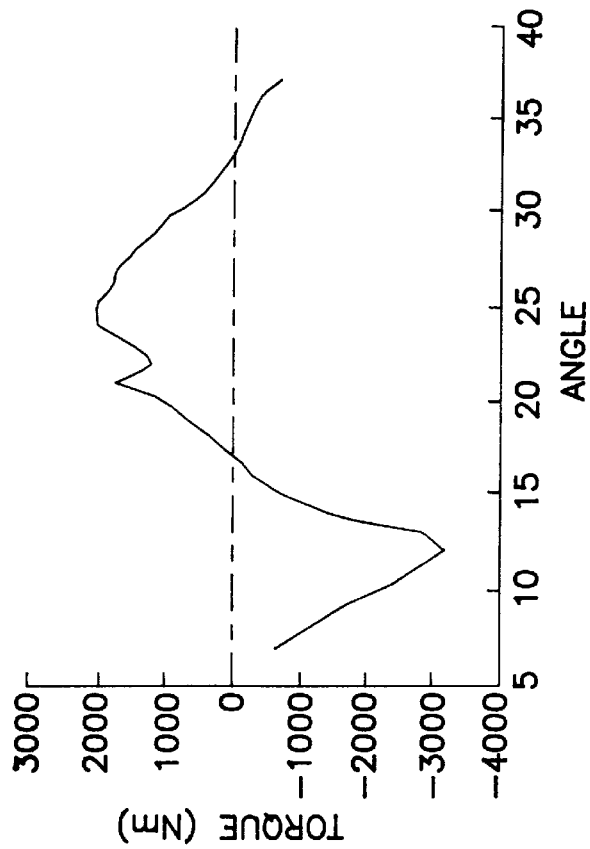

In the present embodiment, the posts have been designed so that they are approximately 10° wide. It may be appreciated that the torque curves shown in FIGS. 28 and 28A are measured between 0° and 30°, where 0° or 30° is representative of complete alignment between the posts 622 and the centerline of the post 629. Although the torque in the composite graph is shown as being essentially negative from just past 0° or 30°, almost until 15°, that is a mere artifact of the frame of reference and, in fact, it represents applied torque tending to turn the fan unit in the clockwise direction. Because the torque was essentially 0° at complete alignment or lock-up, the housing circuit when it is used to commutate between 7° and 22° only switches on when a significant torque component can be provided due to difference in alignment between the inner and outer rotating elements.

The results of this are reflected in FIG. 28 which shows the angles at which both the positive torque peaks at about a 10° relative angle and an angle at which the negative torque peaks which is about at an 8° angle. The toothed wheel is arranged to cause the Hall effect sensor to switch the coil current on at 7° and off at 22°.

The instant embodiment was tested by running the system at 1500 RPM with the generator generating 145 volts effective DC, the coils providing a 20 ohm load. The coils drew about 6.5 amps. The device was able to run at full lock-up with that current up to 2000 RPM without any slippage across the magnetic clutch and with excellent torque transfer thereacross. Further testing was done up to 2350 RPM and no slippage occurred in the clutch. Although a certain amount of ambient heating of the coils takes place, it may be appreciated that both the ram air effect and the good heat transfer through the clutch prevents the coils from overheating and damaging the unit.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A magnetic slip clutch comprising:
   a frame having a rotational support;
   a driving member mounted on the rotational support;
   magnetic field, driving elements mounted on the driving member and comprising a series of coils to be energized for creating magnetic fields;
   a driven member mounted for rotation on the rotational support;
   magnetic field, driven elements separated by an air gap from the series of coils and comprising magnetizable elements without coils which become part of the magnetic fields being generated across the air gap with energization of the series of coils on the driving elements, the magnetizable elements without coils being mounted on the driven member to be magnetically coupled to and driven by the magnetic field, driving elements to rotate the driven member; and
   an electrical control circuit connected to supply-modulated electrical power to modulate the energization of the coils and thereby the magnetic field being generated by the magnetic field, driving elements and thereby varying the torque transfer between the driving member and the driven member between substantially no torque transfer to full torque transfer.

2. A magnetic slip clutch in accordance with claim 1, wherein the driven magnetic field elements are metal bars of magnetizable material without coils being wound thereabout and being magnetized across the air gap by the series of coils on the magnetic field, driving elements.

3. A magnetic slip clutch in accordance with claim 2 wherein the magnetic field, driving elements comprise electromagnet coils which are connected to the electrical control circuit.

4. A magnetic slip clutch in accordance with claim 3 including a pulsing circuit to energize the electromagnets in timed sequence to the position of electromagnet coils relative to position of the magnetic field driven elements.

5. A magnetically driven clutch comprising:
   a plastic mount connected to a stationary part of the vehicle and having a central hub for the clutch;
   a first rotatable plastic member mounted for rotation and carrying an energizable magnetic field;
   bearings on the central hub mounting the first rotatable plastic member for rotation about the central hub;
   a series of coils mounted on the first rotatable plastic member for connection to an electrical source to be energized to provide the energizable magnetic field;
   a second rotatable driven plastic member mounted for rotation relative to the first rotatable member;
   magnetic elements on the driven plastic member to be magnetically coupled to the energizable magnetic field to rotate the driven plastic member; and
   plastic fan blades on the driven plastic member for being driven by a magnetic clutch formed by the energizable magnetic field and the magnetic elements.

6. A driven, magnetic field and fan blade assembly for a magnetic clutch comprising:
   a rotatable, plastic driven member having a body with a central rotational axis;
   the body being cup-shaped with a radially extending wall extending radially outwardly and substantially normal to the central rotational axis;
   an outer rim supporting portion on the radially extending wall;
   an annular rim section on the plastic driven body attached to the outer rim supporting portion and protecting substantially normal to the radially extending wall;
   a free end on the annular rim section opposite an end attached to the outer rim supporting portion of the radially extending wall;
   a plurality of spaced, magnetic members mounted on the plastic driven member which carries the spaced, magnetic members in a circular path about the rotational axis;
   the rim section having its free end located outwardly to allow the rim section to cover the spaced, magnetic members located beneath the rim section; and
   plastic fan blades mounted on the rotatable, plastic, cup-shaped body and rotatable with the outer, magnetic members in a circular path about the rotational axis.

7. A magnetic clutch in accordance with claim 6, wherein the magnetic members are molded in situ, in the plastic member.

8. A magnetic driven field assembly in accordance with claim 6 wherein:
   raised ribs are molded integrally with the plastic member; and
   the raised ribs project outwardly from the plastic member to rotate and to move air to draw heat from the plastic member.

9. A magnetically driven field assembly in accordance with claim 6 wherein,
   a honeycomb section is integrally formed on the plastic driven member to reduce the weight thereof and to provide rigidity and to provide heat dissipation.

10. A magnetically driven field assembly in accordance with claim 6 wherein the magnetic driven members comprise a circular series of metal bars of unmagnetized metal embedded in situ, in an outer, annular rim portion of the plastic member.

11. A magnetic field assembly in accordance with claim 6 wherein the plastic fan blades are integrally molded with the plastic of the plastic driven member.

12. A driven magnetic field assembly in accordance with claim 6 wherein the driven member has ribs, and the ribs are aligned with torque lines being endured by the plastic member as it is driven and rotates the plastic fan blades.

13. A driven magnetic field assembly in accordance with claim 6 wherein a ribbed intermediate portion extends radially between the ribbed, central hub and the annular rim section of the plastic member.

14. A driven magnetic field assembly in accordance with claim 6 wherein the driven plastic member comprises a plastic body which weighs less than five pounds.

15. A driving pulley assembly for a magnetic clutch comprising:
   a rotatable, magnetic field member rotatable about a central axis;
   a plurality of spaced, magnetic members mounted on the field member to magnetically couple to and to drive magnetic field members;
   a driving plastic member for carrying the magnetic field member and for rotating the magnetic field member about the central axis;
   an outer, annular rim portion on the plastic member;
   a fan belt drive portion on the outer rim portion to be driven by a fan belt;
   the clutch being a fan clutch, and the plastic member comprising;
      a honeycomb section on the fan belt annual ring of the plastic member;
      an inner, small diameter hub on the plastic member mounting the same for rotation by the fan belt; and
      a honeycomb section on the hub to strengthen the same.

16. A driving pulley assembly for a magnetic clutch comprising:
   a rotatable, magnetic field member rotatable about a central axis;
   a plurality of spaced, magnetic members mounted on the field member to magnetically couple to and to drive magnetic field members;
   a driving plastic member for carrying the magnetic field member and for rotating the magnetic field member about the central axis;
   an outer, annular rim portion on the plastic member;
   at least one fan belt, grooved portion on the outer rim portion to be driven by a fan belt;
   the plastic driving member comprising:
      an outer, larger diameter, sheave portion having the annular grooved rim portion thereon;
      a smaller diameter hub portion projecting forwardly from and integrally joined to the larger diameter sheave portion; and
      strengthening ribs on a radially-extending side of the larger diameter sheave portion extending to the hub portion to cause air flow with rotation of the driving member to radiate heat and to strengthen the plastic driving member.

17. A driving pulley assembly for a magnetic clutch comprising:
   a rotatable, magnetic field member rotatable about a central axis;
   a plurality of spaced, magnetic members mounted on the field member to magnetically couple to and to drive magnetic field members;
   a driving plastic member for carrying the magnetic field member and for rotating the magnetic field member about the central axis;
   an outer, annular rim portion on the plastic member;
   at least one fan belt, grooved portion on the outer rim portion to be driven by a fan belt;
   the magnetic driving members are electromagnets and further comprising:
      a series of rings in the form of flat discs having radial faces abutted against each other;
      aligned openings are provided in the radial faces of the flat discs; and
      the electromagnets comprise coils of wires wound through the openings in the abutted flat discs.

18. A magnetically driven clutch comprising:
   a driving member mounted for rotation about an axis and mounted on a stationary mount;
   an annular ring on the driving member for being driven by a belt;
   magnetic field, driving members mounted on the plastic driving member for creating magnetic fields;
   a driven member mounted on the stationary mount for rotation about the rotational axis of the driving member;
   first, magnetic, field driven members mounted on the driven member to be magnetically coupled to and driven by the magnetic field, driving members to rotate the driven member at a rotational velocity of substantially less than the rotation velocity of driving member; and
   an electrical generator having a portion mounted on the driving member and rotated by the driving member to generate electrical power for the magnetic clutch.

19. A magnetic clutch in accordance with claim 18 wherein the electrical generator comprises a first series of stationary magnetic coils receiving a trickle current; and
   a series of electromagnetic coils carried on the driving member for rotation past magnetic driven members as the driving member is rotated.

20. A magnetic clutch in accordance with claim 18 wherein the electrical generator generates AC current; and
   a rectifier converts the AC current to DC current for the electromagnetic clutch coils on the driving member.

21. A magnetic clutch in accordance with claim 18 wherein a pulsing circuit provides pulsed current for energizing the electromagnetic coils.

22. A magnetic clutch in accordance with claim 18 wherein a sensing device senses the position of the driving member relative to the driven member and times the energization and de-energization of the electromagnetic coils.

* * * * *